(12) United States Patent
Katsukura et al.

(10) Patent No.: US 12,416,935 B2
(45) Date of Patent: Sep. 16, 2025

(54) CONTROL DEVICE AND POWER CONVERSION SYSTEM

(71) Applicant: TOSHIBA MITSUBISHI-ELECTRIC INDUSTRIAL SYSTEMS CORPORATION, Tokyo (JP)

(72) Inventors: Tomoya Katsukura, Tokyo (JP); Yoshihiro Tawada, Tokyo (JP); Issei Fukasawa, Tokyo (JP); Masahiro Kinoshita, Tokyo (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 0 days.

(21) Appl. No.: 18/700,365

(22) PCT Filed: Oct. 5, 2022

(86) PCT No.: PCT/JP2022/037267
§ 371 (c)(1),
(2) Date: Apr. 11, 2024

(87) PCT Pub. No.: WO2024/075212
PCT Pub. Date: Apr. 11, 2024

(65) Prior Publication Data
US 2025/0224751 A1    Jul. 10, 2025

(51) Int. Cl.
*G05F 1/67* (2006.01)
*H02J 3/38* (2006.01)
*H02M 7/5395* (2006.01)

(52) U.S. Cl.
CPC .............. *G05F 1/67* (2013.01); *H02J 3/381* (2013.01); *H02M 7/5395* (2013.01); *H02J 2300/26* (2020.01)

(58) Field of Classification Search
CPC ..... G05F 1/67; H02J 3/38; H02J 3/381; H02J 2300/26; H02M 7/5395
See application file for complete search history.

(56) References Cited

FOREIGN PATENT DOCUMENTS

JP    2018-195225 A    12/2018

OTHER PUBLICATIONS

International Search Report & Written Opinion issued Dec. 20, 2022 in PCT/JP2022/037267, filed on Oct. 5, 2022, 10 pages (with English Translation).

*Primary Examiner* — Robert L DeBeradinis
(74) *Attorney, Agent, or Firm* — Oblon, McClelland, Maier &Neustadt, L.L.P.

(57) ABSTRACT

A control device includes a modulation rate calculator configured to calculate a modulation rate based on a DC voltage on a DC side an, a limiter configured to update a DC voltage command lower bound limiter based on the lower bound limiter operation value; a maximum power point tracking controller configured to calculate a first DC voltage command value and determine a second DC voltage command value based on the calculated first DC voltage command value and the DC voltage command lower bound limiter set to the limiter, and an inverter controller configured to control an inverter of the power conversion system based on the second DC voltage command value.

9 Claims, 9 Drawing Sheets

CONTROL DEVICE AND POWER CONVERSION SYSTEM

FIELD

The present invention relates to a control device and a power conversion system.

BACKGROUND

Conventionally, a photovoltaics power conversion system configured to perform maximum power point tracking (MPPT) control has been known (refer to PTL 1, for example). Note that, in the present specification below, maximum power point tracking control is also referred to as "MPPT control" or simply as "MPPT", and a maximum power point tracking controller configured to perform maximum power point tracking control (MPPT control) is also referred to as an "MPPT controller".

CITATION LIST

Patent Literature

[PTL 1] JP 2018-195225 A

SUMMARY

Technical Problem

In such a power conversion system configured to perform MPPT control, MPPT control is constantly performed to track the maximum power point of power generated by a solar panel. In MPPT control, information of DC power (DC current and DC voltage) is used to generate the next DC voltage command value, and thus information of AC voltage on the AC side (grid side) is not used.

The power conversion system cannot stably operate at overmodulation, and thus the DC voltage command value needs to be provided with a lower bound limiter to avoid overmodulation. The lower bound limiter of DC voltage needs to be set with consideration on the operation range of grid voltage of the power conversion system, and the upper bound of the grid voltage needs to be substantially 110% of rated grid voltage as provided by grid interconnection regulations of each country.

However, the grid voltage is near 100% for most of every day, and thus when the lower bound limiter of DC voltage is set to be higher to avoid overmodulation based on assumption of 110% of the grid voltage, the operation range on the DC side becomes narrow, which has been a problem.

To solve this problem, it is conceivable to dynamically adjust the DC voltage command value by an MPPT controller in accordance with the grid voltage. However, as described above, MPPT control proceeds out of synchronization with state change of AC voltage. Accordingly, for example, when the DC voltage command value is updated based on a modulation rate during calculation of DC power by MPPT control, correct magnitude evaluation of DC power is potentially not performed by MPPT control. Thus, it has been conventionally impossible to generate the DC voltage command value with consideration on the modulation rate.

In an energy-storage-system power conversion system, DC voltage is used to monitor the operation range of the power conversion system, and when the lower bound limiter of the DC voltage is variable in accordance with the modulation rate, a wider range can be set for the lower bound value of the voltage in accordance with the modulation rate and the operation range can be increased.

Thus, the present disclosure is intended to provide a technology that can set a wider operation range on the DC side than in conventional cases by updating the lower bound limiter of DC voltage in accordance with the modulation rate and can stably operate a power conversion system without overmodulation.

Solution to Problem

A control device according to an aspect is a control device in a photovoltaics power conversion system connected to a solar panel on a DC side and includes: a modulation rate calculator configured to calculate a modulation rate based on a DC voltage on a DC side of the power conversion system and a grid voltage root mean square value on an AC side of the power conversion system; a limiter adjuster configured to calculate a lower bound limiter operation value based on a predetermined lower bound limiter set value, the grid voltage root mean square value, and a predetermined rated value in accordance with the modulation rate calculated by the modulation rate calculator; a limiter configured to update a DC voltage command lower bound limiter based on the lower bound limiter operation value calculated by the limiter adjuster; a maximum power point tracking controller configured to calculate a first DC voltage command value by performing maximum power point tracking control based on DC power generated by the solar panel and determine a second DC voltage command value based on the calculated first DC voltage command value and the DC voltage command lower bound limiter set to the limiter; and an inverter controller configured to control an inverter of the power conversion system based on the second DC voltage command value determined by the maximum power point tracking controller.

A photovoltaics power conversion system according to an aspect is connected to a solar panel at which power generation is performed by sunlight and includes an inverter configured to convert DC power generated by the solar panel into AC power, and the above-described control device.

A control device according to another aspect is a control device in an energy-storage-system power conversion system connected to an energy storage system on a DC side and includes: a modulation rate calculator configured to calculate a modulation rate based on a DC voltage on a DC side of the power conversion system and a grid voltage root mean square value on an AC side of the power conversion system; a limiter adjuster configured to calculate an operation range lower bound voltage operation value based on a predetermined operation range lower bound voltage set value, the grid voltage root mean square value, and a predetermined rated value in accordance with the modulation rate calculated by the modulation rate calculator; a limiter configured to update operation range lower bound voltage based on the operation range lower bound voltage operation value calculated by the limiter adjuster; a DC voltage operation range detector configured to compare the DC voltage on the DC side of the power conversion system and the operation range lower bound voltage set to the limiter and determine whether the DC voltage is smaller than the operation range lower bound voltage; and an operation controller configured to stop an inverter of the power conversion system when it is determined by the DC voltage operation range detector that the DC voltage is smaller than the operation range lower bound voltage.

An energy-storage-system power conversion system according to another aspect is connected to an energy storage system capable of charging and discharging electric power and includes an inverter configured to convert DC power supplied from the energy storage system into AC power, and the above-described control device.

Advantageous Effects of Invention

According to the present disclosure, it is possible to provide a technology that can set a wider operation range on the DC side than in conventional cases by updating the lower bound limiter of DC voltage in accordance with the modulation rate and can stably operate a power conversion system without overmodulation.

DESCRIPTION OF EMBODIMENTS

Embodiments of a control device and a power conversion system according to the present disclosure will be described below with reference to the accompanying drawings.

Configuration of First Embodiment

Figure 1:
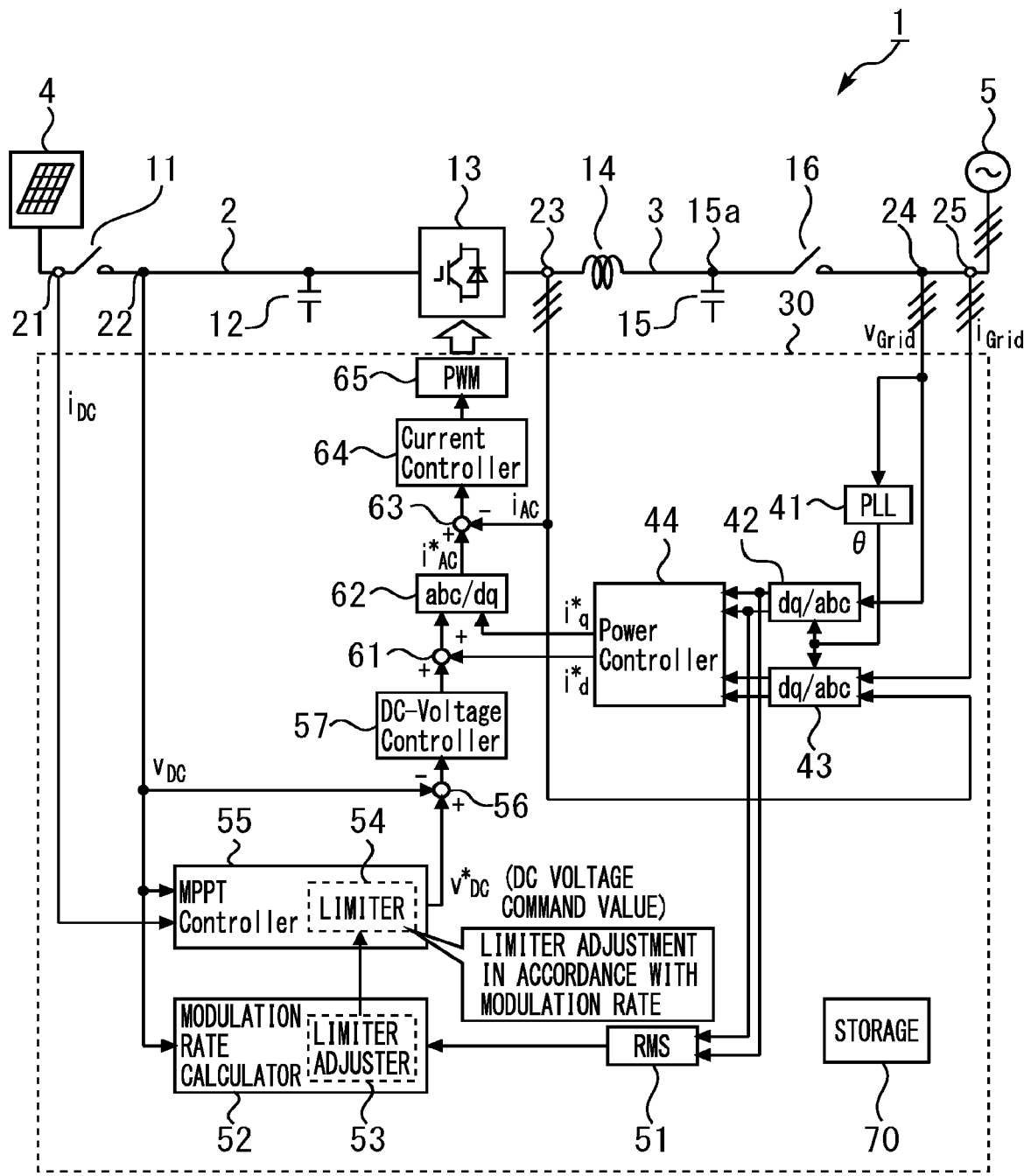
FIG. 1 is a diagram illustrating an example of the configuration of a control device and a power conversion system according to a first embodiment.

FIG. 1 is a diagram illustrating an example of the configuration of a control device 30 and a power conversion system 1 according to a first embodiment. In FIG. 1, the power conversion system 1 is connected to a solar panel 4 through a DC bus 2 on one end side (input side) on the left side in FIG. 1 and is connected to an AC power grid 5 through an AC circuit 3 on the other end side (output side) on the right side in FIG. 1.

For example, the power conversion system (PCS: Power Conditioning System) 1 converts DC power supplied from the solar panel 4 into AC power and outputs the converted AC power to the AC power grid 5 side (AC side). In other words, the power conversion system 1 in the present embodiment is a photovoltaics (PV) power conversion system (PV-PCS: Photovoltaics-Power Conditioning System). Hereinafter, in the present specification, the power conversion system 1 is also referred to as the "PV-PCS 1" or simply as the "PCS 1".

As illustrated in FIG. 1, the power conversion system 1 includes a DC switch 11, a DC capacitor 12, an inverter 13, an AC reactor 14, an AC capacitor 15, and an AC switch 16. The power conversion system 1 also includes a first current sensor 21, a first voltage sensor 22, a second current sensor 23, a second voltage sensor 24, a third current sensor 25, and the control device 30. Note that the control device 30 is electrically connected to each elements of the power conversion system 1 although wires are omitted in the drawing.

The DC bus 2 connects the solar panel 4 and a DC end (input side) of the inverter 13 of the power conversion system 1. The DC bus 2 supplies DC power generated by the solar panel 4 to the inverter 13. For example, the first current sensor 21, the DC switch 11, the first voltage sensor 22, and the DC capacitor 12 are arranged on the DC bus 2 in order from the solar panel 4 toward the DC end of the inverter 13.

The AC circuit 3 connects an AC end (output side) of the inverter 13 of the power conversion system 1 and the AC power grid 5. The AC circuit 3 is, for example, a three-phase three-wire three-phase AC circuit configured to supply, by using three electrical lines or cables, three-phase AC power as combination of three-grid single-phase AC currents having current or voltage phases shifted from one another. The AC circuit 3 supplies AC power converted by the inverter 13 to the AC power grid 5 side. For example, the second current sensor 23, the AC reactor 14, the AC capacitor 15, the AC switch 16, the second voltage sensor 24, and the third current sensor 25 are arranged in the AC circuit 3 in order from the AC end of the inverter 13 toward the AC power grid 5.

The solar panel (solar battery panel) 4 is connected to the DC end (input end) of the inverter 13 through the DC bus 2. The solar panel 4 is referred to as a solar module or a solar battery module or simply as a solar battery, a module, or the like and is, for example, one panel as combination of a plurality of solar battery cells. The solar panel 4 may be, for example, a solar battery string as combination of a plurality of panels in series or parallel to one another, or a solar battery array as combination of solar battery strings. The solar panel 4 generates power with sunlight and supplies generated DC power to the inverter 13 through the DC bus 2. Note that, in the present specification below, the solar panel 4 is also referred to as the "solar battery panel 4" or the "PV (photovoltaics) panel 4".

The AC power grid (grid) 5 is connected to the AC end (output end) of the inverter 13 through the AC circuit 3. The AC power grid 5 is an integrated system of power generation, power transformation, power transmission, and power distribution, which is connected to a non-illustrated transformer to supply AC power transformed by the non-illustrated transformer to a power receiving facility of a consumer, and is connected to, for example, an unspecified load. Note that, in the present specification below, the AC power grid 5 is also referred to as the "power grid 5" or simply as the "grid 5".

The DC switch (DC breaker) 11 is provided between the first current sensor 21 and the first voltage sensor 22 on the DC bus 2. The DC switch 11 closes (connects) or opens (cuts) the DC bus 2 between the solar panel 4 and the inverter 13 in accordance with a close instruction or an open instruction from the control device 30, a non-illustrated operator, or the like. When the DC switch 11 is opened, DC power supplied from the solar panel 4 to the inverter 13 is cut. Note that, in the present specification below, the DC switch 11 is also referred to as the "DC switch 11".

The DC capacitor 12 is provided between the first voltage sensor 22 and the DC end of the inverter 13 on the DC bus 2. The DC capacitor 12 is a smoothing capacitor configured to smooth DC voltage output from the solar panel 4. For example, the DC capacitor 12 is charged by DC power from the solar panel 4 and voltage thereof increases when the DC switch 11 is closed, and the DC capacitor 12 is discharged by a discharging circuit, a discharging resistance, or the like non-illustrated and voltage thereof decreases when the DC switch 11 is opened. Hereinafter, in the present specification, the DC capacitor 12 is also referred to as the "DC capacitor 12".

In the inverter (inverter circuit) 13, the one end side as the DC end is connected to the DC capacitor 12 and the DC switch 11 through the DC bus 2, and the other end side as the AC end is connected to the AC reactor 14 through the AC circuit 3. The inverter circuit 13 is constituted by a plurality of switching elements such as insulated gate bipolar transistors (IGBT). The inverter circuit 13 is controlled by, for example, a pulse width modulation (PWM) signal that is a gate drive signal (gate signal) generated for the switching elements by a pulse width modulation (PWM) controller 65 to be described later.

The inverter 13 acquires, from the one end side, DC power supplied from the solar panel 4, converts the acquired DC power into AC power in accordance with control by a pulse width modulation signal (gate signal), and supplies the AC power to the grid 5 side through outputting from the other end side as the output end. Note that, in the present specification below, the pulse width modulation signal is also referred to as the "PWM signal".

The AC reactor 14 is connected in series to the AC end of the inverter 13 in the AC circuit 3. The AC reactor 14 is a smoothing element having, for example, a noise reducing effect and a surge voltage suppressing effect. For example, the AC reactor 14 constitutes, together with the AC capacitor 15 connected in an L shape through a bifurcation point 15a, an LC filter circuit (filter circuit) configured to reduce ripples (vibration) that occur at switching of the non-illustrated switching elements of the inverter 13. Note that, in the present specification below, the AC reactor 14 is also referred to as the "AC reactor 14".

The AC capacitor 15 is an electronic component configured to charge or discharge electricity (electric charge) and is connected to the AC reactor 14 in an L shape through the bifurcation point 15a in the AC circuit 3. For example, the AC capacitor 15 constitutes, together with the AC reactor 14 connected in an L shape, the LC filter circuit (filter circuit) configured to reduce ripples (vibration) that occur at switching of the non-illustrated switching elements of the inverter 13. The AC capacitor 15 constituting the filter circuit together with the AC reactor 14 reduces harmonic (harmonic current) outflow to a non-illustrated grid side. Hereinafter, in the present specification, the AC capacitor 15 is also referred to as the "AC capacitor 15".

The AC switch (AC breaker) 16 is provided in series between the AC power grid 5 and each of the AC reactor and the AC capacitor in the AC circuit 3. The AC switch 16 closes (connects) or opens (cuts off) the AC circuit 3 between the inverter 13 and the grid 5 in accordance with a close instruction or an open instruction from the control device 30, the non-illustrated operator, or the like. AC power supplied from the inverter 13 to the grid 5 side is cut when the AC switch 16 is opened. Hereinafter, in the present specification, the AC switch 16 is also referred to as the "AC switch 16".

The first current sensor 21 is, for example, a known DC ammeter or DC sensor, is arranged between the PV panel 4 and the DC switch 11 on the DC side, and detects the value of DC current $i_{DC}$ flowing from the PV panel 4. Note that the position at which the first current sensor 21 is arranged is not limited to the position illustrated in FIG. 1 but may be any position at which the first current sensor 21 can detect the value of the DC current $i_{DC}$ flowing from the PV panel 4. Hereinafter, in the present specification, the value of the DC current $i_{DC}$ is also simply referred to as the "DC current $i_{DC}$". The DC current $i_{DC}$ detected by the first current sensor 21 is acquired by the control device 30.

The first voltage sensor 22 is, for example, a known DC voltmeter or DC voltage sensor, is arranged between the DC switch 11 and the DC capacitor 12 on the DC side, and detects the value of DC voltage $v_{DC}$ of the DC capacitor 12. Note that the position at which the first voltage sensor 22 is arranged is not limited to the position illustrated in FIG. 1 but may be any position at which the first voltage sensor 22 can detect the value of the DC voltage $v_{DC}$ of the DC capacitor 12. Hereinafter, in the present specification, the value of the DC voltage $v_{DC}$ is also simply referred to as the "DC voltage $v_{DC}$". The DC voltage $v_{DC}$ detected by the first voltage sensor 22 is acquired by the control device 30.

The second current sensor 23 is, for example, a known AC ammeter or AC sensor, is arranged between the inverter 13 and the AC reactor 14 on the AC side, and detects the value of inverter output current $i_{AC}$ as three-phase AC current output from the inverter 13. Note that the position at which the second current sensor 23 is arranged is not limited to the position illustrated in FIG. 1 but may be any position at which the second current sensor 23 can detect the value of the inverter output current $i_{AC}$ output from the inverter 13. Hereinafter, in the present specification, the value of the inverter output current $i_{AC}$ is also simply referred to as the "inverter output current $i_{AC}$". The inverter output current $i_{AC}$ detected by the second current sensor 23 is acquired by the control device 30.

The second voltage sensor 24 is, for example, a known AC voltmeter or AC voltage sensor, is arranged between the AC switch 16 and the grid 5 on the AC side, and detects the value of grid voltage $v_{Grid}$ as three-phase AC voltage in the grid 5. Note that the position at which the second voltage sensor 24 is arranged is not limited to the position illustrated in FIG. 1 but may be any position at which the second voltage sensor 24 can detect the value of the grid voltage $v_{Grid}$ in the grid 5. Hereinafter, in the present specification, the value of the grid voltage $v_{Grid}$ is also simply referred to as the "grid voltage $v_{Grid}$". The grid voltage $v_{Grid}$ detected by the second voltage sensor 24 is acquired by the control device 30.

The third current sensor 25 is, for example, a known AC ammeter or AC sensor, is arranged between the AC switch 16 and the grid 5 on the AC side, and detects the value of AC current $i_{Grid}$ as three-phase AC current flowing to the grid 5. Note that the position at which the third current sensor 25 is arranged is not limited to the position illustrated in FIG. 1 but may be any position at which the third current sensor 25 can detect the value of the AC current $i_{Grid}$ flowing to the grid 5. Hereinafter, in the present specification, the value of the AC current $i_{Grid}$ is also simply referred to as "grid current $i_{Grid}$". The grid current $i_{Grid}$ detected by the third current sensor 25 is acquired by the control device 30.

For example, the control device 30 is provided inside or outside the power conversion system 1 and connected to each component of the power conversion system 1 such as the inverter 13 in a wired or wireless manner although wires and the like are omitted in the drawing. Note that the control device 30 may be implemented as a function of a non-illustrated inverter control circuit.

The control device 30 includes a processor 91 (refer to FIG. 9) to be described later, such as a central processing unit (CPU), a micro processing unit (MPU), or a graphics processing unit (GPU), the processor 91 being configured to operate by executing a computer program. The control device 30 also includes a storage 70 and a memory 92 (refer to FIG. 9) to be described later and collectively controls operation of the power conversion system 1 by operating the processor 91 through, for example, execution of a predetermined computer program stored in the storage 70 or the memory 92.

Note that the control device 30 may operate in accordance with, for example, an instruction from a non-illustrated higher-level device or an instruction from the operator through a non-illustrated operation unit. Note that, for example, the non-illustrated higher-level device collectively monitors or controls a plurality of power conversion systems 1 and is connected to each power conversion system 1 in a wired or wireless manner.

As illustrated in FIG. 1, the control device 30 includes components or functions as a phase locked loop (PLL) controller 41, a first converter 42, a second converter 43, and a power controller 44. The control device 30 also includes components or functions as a root mean square value (RMS) calculator 51, a modulation rate calculator 52, and a limiter adjuster 53. The control device 30 also includes components or functions as a limiter 54, a maximum power point tracking controller (MPPT controller) 55, a first subtractor 56, and a DC voltage controller 57. Note that, in the present embodiment, the modulation rate calculator 52 includes a component or a function as the limiter adjuster 53, and the MPPT controller 55 includes a component or a function as the limiter 54. The control device 30 also includes components or functions as a first adder 61, a third converter 62, a second subtractor 63, a current controller 64, and a PWM controller 65.

Note that each above-described component or function may be implemented by a computer program executed by the processor 91 (refer to FIG. 9) to be described later in a processing circuit 90 (refer to FIG. 9) included in the control device 30 and to be described later or may be implemented by a hardware component 93 (refer to FIG. 9) to be described later. The control device 30 executes a predetermined computer program and performs processing below with each above-described component or function.

The PLL controller 41 is connected to the second voltage sensor 24, the first converter 42, and the second converter 43. The PLL controller 41 acquires information of the grid voltage $v_{Grid}$ as a value detected by the second voltage sensor 24. The PLL controller 41 performs PLL control based on the grid voltage $v_{Grid}$ and outputs information of a reference phase θ synchronized with the grid voltage $v_{Grid}$ to the first converter 42 and the second converter 43.

The first converter 42 is connected to the second voltage sensor 24, the PLL controller 41, the power controller 44, and the root mean square value calculator 51. The first converter 42 acquires the information of the grid voltage $v_{Grid}$ as a value detected by the second voltage sensor 24 and the information of the reference phase θ output from the PLL controller 41. The first converter 42 performs three-phase two-phase conversion (dq conversion) based on the acquired reference phase θ to convert the grid voltage $v_{Grid}$ into a d-axial voltage value and a q-axial voltage value. Note that the reference phase θ of the dq conversion has a q-axial voltage component of zero, for example. The first converter 42 outputs information of the d-axial voltage value and information of the q-axial voltage value to the power controller 44 and the root mean square value calculator 51.

The second converter 43 is connected to the second current sensor 23, the third current sensor 25, and the power controller 44. The second converter 43 acquires information of the inverter output current $i_{AC}$ as a value detected by the second current sensor 23, information of the grid current $i_{Grid}$ as a value detected by the third current sensor 25, and the information of the reference phase θ output from the PLL controller 41. The second converter 43 performs three-phase two-phase conversion (dq conversion) based on the acquired reference phase θ to convert the inverter output current $i_{AC}$ and the grid current $i_{Grid}$ into a d-axial current value and a q-axial current value. Note that the reference phase θ of the dq conversion has a q-axial voltage component of zero, for example. The second converter 43 outputs information of the d-axial current value and information of the q-axial current value to the power controller 44.

The power controller 44 is connected to the first converter 42, the second converter 43, the first adder 61, and the third converter 62. The power controller 44 acquires the information of the d-axial voltage value and the information of the q-axial voltage value from the first converter 42 and acquires the information of the d-axial current value and the information of the q-axial current value from the second converter 43. The power controller 44 calculates information of a d-axial current command value $i^*_d$ and information of a q-axial current command value $i^*_q$ based on the information of the d-axial voltage value, the information of the q-axial voltage value, the information of the d-axial current value, and the information of the q-axial current value thus acquired. The power controller 44 outputs the calculated information of the d-axial current command value $i^*_d$ to the first adder 61 and outputs the calculated information of the q-axial current command value $i^*_q$ to the third converter 62.

The root mean square value calculator (RMS calculator) 51 is connected to the first converter 42 and the modulation rate calculator 52. The root mean square value calculator 51 acquires the information of the d-axial voltage value and the information of the q-axial voltage value from the first converter 42. The root mean square value calculator 51 calculates a grid voltage root mean square value $v_{RMS}$ based on the information of the d-axial voltage value and the information of the q-axial voltage value thus acquired. The root mean square value calculator 51 outputs information of the calculated grid voltage root mean square value $v_{RMS}$ to the modulation rate calculator 52. Note that, in the present specification below, the root mean square value calculator 51 is also referred to as the "RMS calculator 51".

The modulation rate calculator 52 is connected to the first voltage sensor 22 and the root mean square value calculator 51. The modulation rate calculator 52 acquires information of the DC voltage $v_{DC}$ that is a value detected by the first voltage sensor 22 and the information of the grid voltage root mean square value $v_{RMS}$ from the root mean square value calculator 51. The modulation rate calculator 52 calculates a modulation rate based on the information of the DC voltage $v_{DC}$ and the information of the grid voltage root mean square value $v_{RMS}$ thus acquired. Note that the modulation rate calculator 52 may calculate the modulation rate constantly or at each predetermined interval or may calculate the modulation rate at optional timings.

The modulation rate calculator 52 includes the limiter adjuster 53 and outputs, for example, the calculated modulation rate to the limiter adjuster 53. Note that the modulation rate calculator 52 may output information of whether the calculated modulation rate exceeds one (modulation rate >100%) to the limiter adjuster 53. Alternatively, only when the calculated modulation rate exceeds one (modulation rate >100%), the modulation rate calculator 52 may output the calculated modulation rate or information that the calculated modulation rate exceeds one (modulation rate >100%) to the limiter adjuster 53.

The limiter adjuster 53 is provided as, for example, part of the modulation rate calculator 52 and is connected to the root mean square value calculator 51 through the modulation rate calculator 52 and also connected to the limiter 54 through the MPPT controller 55. The limiter adjuster 53 is also connected to the storage 70 although wires are omitted in the drawing. The limiter adjuster 53 acquires information of the modulation rate from the modulation rate calculator 52 and acquires information of a lower bound limiter set value $v_{L1}$ and information of a rated value $v_R$ from the storage 70.

The limiter adjuster 53 calculates a lower bound limiter operation value $v_{L2}$ based on the lower bound limiter set value $v_{L1}$, the rated value $v_R$, and the grid voltage root mean square value $v_{RMS}$ thus acquired. Note that the limiter adjuster 53 constantly performs the calculation and updates (calculates) the lower bound limiter operation value $v_{L2}$ whether the modulation rate exceeds one (modulation rate >100%) or does not exceed one (modulation rate ≤100%). Then, the limiter adjuster 53 outputs the calculated lower bound limiter operation value $v_{L2}$ to the limiter 54. As a result, the modulation rate eventually becomes smaller than one.

Note that the limiter adjuster 53 does not necessarily need to output the lower bound limiter operation value $v_{L2}$ to the limiter 54 when the lower bound limiter operation value $v_{L2}$ has no variation as a result of the calculation. Alternatively, the limiter adjuster 53 may output the lower bound limiter operation value $v_{L2}$ to the limiter 54 constantly, at each predetermined interval, or at optional timings irrespective of the existence of variation in the modulation rate and the existence of variation in the lower bound limiter operation value $v_{L2}$.

Note that the modulation rate calculator 52 and the limiter adjuster 53 are not limited to the configuration illustrated in FIG. 1, but the modulation rate calculator 52 and the limiter adjuster 53 only need to operate out of synchronization with the MPPT controller 55 at least. Specifically, as long as the modulation rate calculator 52 and the limiter adjuster 53 operate out of synchronization with the MPPT controller 55, the modulation rate calculator 52 and the limiter adjuster 53 may be an integrated component or completely separate components, or the limiter adjuster 53 may include the modulation rate calculator 52.

The limiter 54 is provided as, for example, part of the MPPT controller 55 and connected to the limiter adjuster 53 through the modulation rate calculator 52. The limiter 54 acquires information of the lower bound limiter operation value $v_{L2}$ from the limiter adjuster 53. Note that the limiter 54 may acquire the information of the lower bound limiter operation value $v_{L2}$ from the limiter adjuster 53 only when the lower bound limiter operation value $v_{L2}$ has varied. Alternatively, the limiter 54 may acquire the information of the lower bound limiter operation value $v_{L2}$ from the limiter adjuster 53 constantly, at each predetermined interval, or at optional timings.

When having acquired the information of the lower bound limiter operation value $v_{L2}$ from the limiter adjuster 53, the limiter 54 updates the value of a DC voltage command lower bound limiter $v_L$ set to the limiter 54. Accordingly, the value of the DC voltage command lower bound limiter $v_L$ is updated in accordance with the modulation rate. Note that the limiter 54 does not necessarily need to update the value of the DC voltage command lower bound limiter $v_L$ when the lower bound limiter operation value $v_{L2}$ has no variation. The limiter 54 sets the updated lower bound limiter operation value $v_{L2}$ as the present value of the DC voltage command lower bound limiter $v_L$.

The maximum power point tracking controller (MPPT controller) 55 is connected to the first current sensor 21, the first voltage sensor 22, and the first subtractor 56. The MPPT controller 55 acquires information of the DC current $i_{DC}$ that is a value detected by the first current sensor 21 and the information of the DC voltage $v_{DC}$ that is a value detected by the first voltage sensor 22. The MPPT controller 55 performs MPPT control based on, for example, a known hill climbing method based on the information of the DC current $i_{DC}$ and the information of the DC voltage $v_{DC}$ thus acquired and calculates a DC voltage command value $v'^*_{DC}$. The range (limiter range) of the MPPT control by the MPPT controller 55 is determined, for example, for each device. Note that the DC voltage command value $v'^*_{DC}$ is an example of "first DC voltage command value".

The MPPT controller 55 includes the limiter 54 and compares the calculated DC voltage command value $v'^*_{DC}$ and the present DC voltage command lower bound limiter $v_L$ set to the limiter 54. As a result of the comparison, when the calculated DC voltage command value $v'^*_{DC}$ is smaller than the DC voltage command lower bound limiter $v_L$ set to the limiter 54, the MPPT controller 55 determines the value of the DC voltage command lower bound limiter $v_L$ to be the next DC voltage command value $v^*_{DC}$. When the calculated DC voltage command value $v'^*_{DC}$ is equal to or larger than the value of the DC voltage command lower bound limiter $v_L$ set to the limiter 54, the MPPT controller 55 determines the calculated DC voltage command value $v'^*_{DC}$ to be the next DC voltage command value $v^*_{DC}$. The MPPT controller 55 outputs information of the determined DC voltage command value $v^*_{DC}$ to the first subtractor 56. Note that the DC voltage command value $v^*_{DC}$ is an example of "second DC voltage command value".

The first subtractor 56 is connected to the first voltage sensor 22 and the MPPT controller 55. The first subtractor 56 acquires the information of the DC voltage $v_{DC}$ that is a value detected by the first voltage sensor 22 and the information of the DC voltage command value $v^*_{DC}$ output from the MPPT controller 55. The first subtractor 56 calculates a value by subtracting the DC voltage $v_{DC}$ from the DC voltage command value $v^*_{DC}$. The first subtractor 56 outputs information of the value calculated by subtracting the DC voltage $v_{DC}$ from the DC voltage command value $v^*_{DC}$ to the DC voltage controller 57.

The DC voltage controller 57 is connected to the first subtractor 56 and the first adder 61. The DC voltage controller 57 acquires the information of the value calculated by subtracting the DC voltage $v_{DC}$ from the DC voltage command value $v^*_{DC}$ and output from the first subtractor 56. The DC voltage controller 57 calculates a d-axial current command value by controlling the acquired information. The DC voltage controller 57 outputs information of the calculated d-axial current command value to the first adder 61.

The first adder 61 is connected to the power controller 44, the DC voltage controller 57, and the third converter 62. The first adder 61 acquires the information of the d-axial current command value $i^*_d$ output from the power controller 44 and the information of the d-axial current command value output from the DC voltage controller 57. The first adder 61 calculates a value by adding the d-axial current command value $i^*_d$ and the d-axial current command value thus acquired. The first adder 61 outputs information of the value calculated by adding the d-axial current command value $i^*_d$ and the d-axial current command value to the third converter 62.

The third converter 62 is connected to the power controller 44, the first adder 61, and the second subtractor 63. The third converter 62 acquires the information of the q-axial current command value $i^*_q$ output from the power controller 44 and the information of the value obtained by adding the d-axial current command value $i^*_d$ and the d-axial current command value and output from the first adder 61. The third converter 62 calculates a current command value $i^*_{AC}$ through two-phase three-phase conversion (inverse dq conversion) of the acquired information. The third converter 62 outputs information of the calculated current command value $i^*_{AC}$ to the second subtractor 63.

The second subtractor 63 is connected to the second current sensor 23, the third converter 62, and the current controller 64. The second subtractor 63 acquires the information of the inverter output current $i_{AC}$ as a value detected by the second current sensor 23 and the information of the current command value $i^*_{AC}$ output from the third converter 62. The second subtractor 63 calculates a value by subtracting the inverter output current $i_{AC}$ from the current command value $i^*_{AC}$. The second subtractor 63 outputs information of the value calculated by subtracting the inverter output current $i_{AC}$ from the current command value $i^*_{AC}$ to the current controller 64.

The current controller 64 is connected to the second subtractor 63 and the PWM controller 65. The current controller 64 acquires the information of the value calculated by subtracting the inverter output current $i_{AC}$ from the current command value $i^*_{AC}$ and output from the second subtractor 63. The current controller 64 calculates a voltage command value by controlling the acquired information. The current controller 64 outputs the calculated voltage command value to the PWM controller 65.

The pulse width modulation controller (PWM controller) 65 is connected to the inverter 13 and the current controller 64. The PWM controller 65 acquires the voltage command value from the current controller 64. The PWM controller 65 performs PWM control based on the acquired voltage command value to generate a gate signal as the pulse width modulation signal (PWM signal). The PWM controller 65 outputs the generated gate signal to the inverter 13 and collectively controls operation of the inverter 13 by controlling the non-illustrated switching elements of the inverter 13. Note that the PWM controller 65 is an example of "inverter controller".

The storage 70 is a volatile or non-volatile storage medium such as a hard disk drive (HDD), a solid state drive (SSD), a dynamic random access memory (DRAM), or any other semiconductor memory. The storage 70 is connected to each component of the control device 30 such that various kinds of information can be input and output through, for example, a non-illustrated bus (system bus). The storage 70 stores, for example, a computer program necessary for operation of each component of the control device 30 and is subjected to writing and reading of various kinds of information by each component of the control device 30.

The storage 70 stores a value acquired by each sensor such as the first current sensor 21. The storage 70 also stores, for example, various calculation formulae, coefficients, thresholds, and the like used for calculation by components such as the limiter adjuster 53 and the MPPT controller 55, predetermined rated values, and limiter values. The storage 70 also stores, for example, results of calculation by components such as the root mean square value calculator 51, the modulation rate calculator 52, the limiter adjuster 53, and the MPPT controller 55.

Note that the storage 70 may be provided outside the control device 30 and connected to the control device 30 in a wired or wireless manner and may be an external storage medium such as a memory card or a digital versatile disc (DVD) or may be an online storage or the like. The storage 70 may be the same as the memory 92 (refer to FIG. 9) to be described later.

Figure 2:
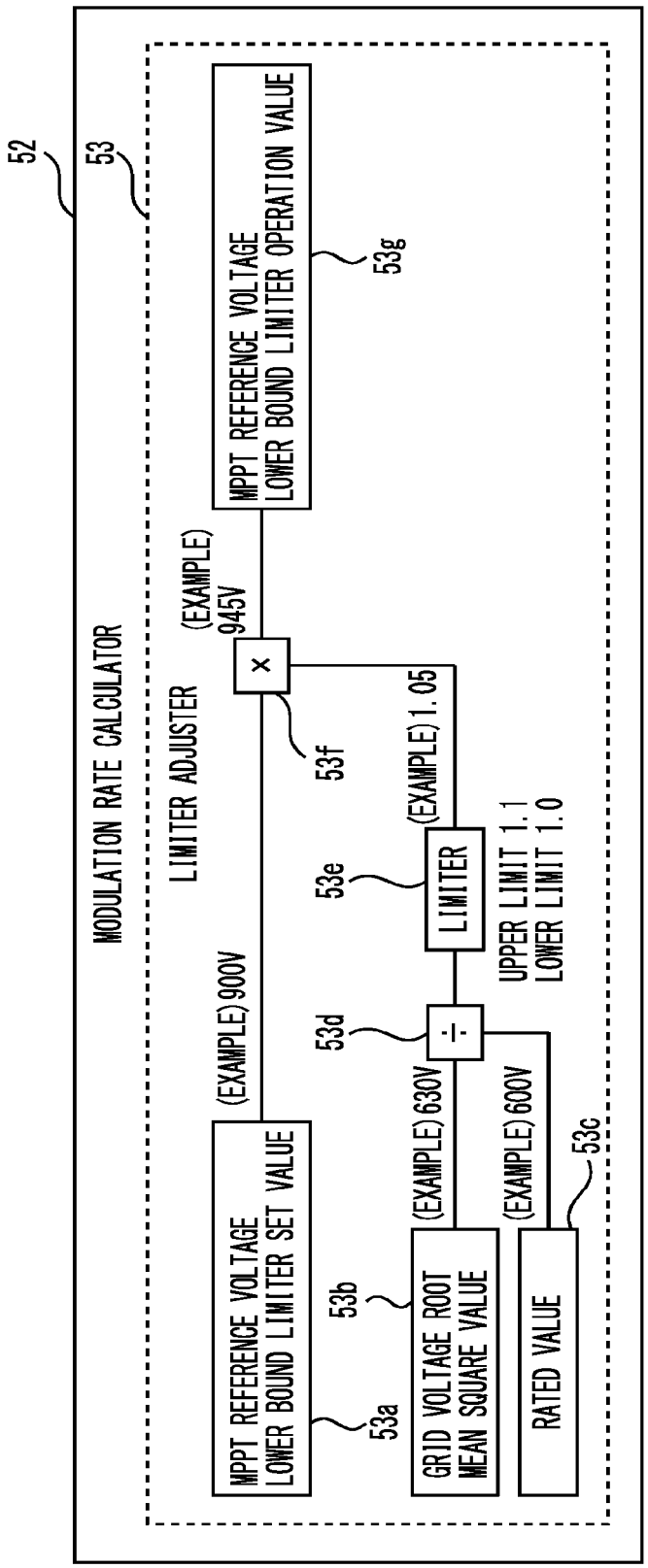
FIG. 2 is a diagram illustrating an example of the configuration and processing of a modulation rate calculator and a limiter adjuster illustrated in FIG. 1.

FIG. 2 is a diagram illustrating an example of the configuration and processing of the modulation rate calculator 52 and the limiter adjuster 53 illustrated in FIG. 1.

Although wires are omitted in the drawing, the modulation rate calculator 52 is connected to the first voltage sensor 22 and the root mean square value calculator 51 as described above with reference to FIG. 1, acquires the information of the DC voltage $v_{DC}$ from the first voltage sensor 22, and acquires the information of the grid voltage root mean square value $v_{RMS}$ from the root mean square value calculator 51. The modulation rate calculator 52 calculates the modulation rate based on the information of the DC voltage $v_{DC}$ and the information of the grid voltage root mean square value $v_{RMS}$ thus acquired.

The modulation rate calculator 52 calculates the modulation rate by, for example, Expression (1) below as exemplarily illustrated at a lower part of FIG. 2. Note that, in Expression (1), "grid voltage root mean square value"×√2 is a peak value of the grid voltage.

$$\text{"modulation rate"} = \text{"grid voltage root mean square value"} \times \sqrt{2}/\text{"DC voltage"} \quad (1)$$

Note that, as illustrated at the lower part of FIG. 2, occurrence of overmodulation is determined when the modulation rate is larger than 100% (modulation rate >100%), in other words, when the modulation rate exceeds one.

A case in which the grid voltage root mean square value $v_{RMS}$ is 600 V and the DC voltage $v_{DC}$ is 1000 V will be described below as an example. In this case, the modulation rate is calculated as 600 V×√2/1000 V=84.9% based on Expression (1). In this case, overmodulation does not occur since the modulation rate does not exceed one (modulation rate≤100%). Note that the power conversion system 1 can stably operate when overmodulation does not occur.

A case in which the grid voltage root mean square value $v_{RMS}$ increases by 10% to 660 V and the DC voltage $v_{DC}$ simultaneously decreases to 930 V will be described below as another example. In this case, the modulation rate is calculated as 660 V×√2/930 V=100.4% based on Expression (1). In this case, overmodulation occurs since the modulation rate exceeds one (modulation rate >100%). Note that the power conversion system 1 cannot stably operate when overmodulation occurs.

As described above with reference to FIG. 1, the modulation rate calculator 52 outputs the calculated modulation rate or information of whether the calculated modulation rate exceeds one (modulation rate >100%) to the limiter adjuster 53. Alternatively, only when the calculated modulation rate exceeds one (modulation rate >100%), the modulation rate calculator 52 may output the calculated modulation rate or information that the calculated modulation rate exceeds one (modulation rate >100%) to the limiter adjuster 53.

Although wires are omitted in the drawing, the limiter adjuster 53 is connected to the root mean square value calculator 51, the limiter 54, and the storage 70 as described above with reference to FIG. 1. The limiter adjuster 53 includes, for example, a lower bound limiter set value acquirer 53a, a grid voltage root mean square value acquirer 53b, a rated value acquirer 53c, a divider 53d, an upper-lower bound limiter 53e, a multiplier 53f, and a lower bound limiter operation value outputter 53g.

The lower bound limiter set value acquirer 53a is connected to the storage 70 and the multiplier 53f. The lower bound limiter set value acquirer 53a acquires the lower bound limiter set value $v_{L1}$ of MPPT reference voltage from the storage 70 and outputs the acquired lower bound limiter set value $v_{L1}$ to the multiplier 53f. Note that the lower bound limiter set value $v_{L1}$ of MPPT reference voltage is determined to be a predetermined value for each device as a specification, for example. In the example illustrated in FIG. 2, the lower bound limiter set value acquirer 53a acquires 900 V as the lower bound limiter set value $v_{L1}$ from the storage 70 and outputs 900 V thus acquired to the multiplier 53f.

The grid voltage root mean square value acquirer 53b is connected to the root mean square value calculator 51 and the divider 53d. The grid voltage root mean square value acquirer 53b acquires the grid voltage root mean square value $v_{RMS}$ calculated by the root mean square value calculator 51 from the root mean square value calculator 51 and outputs the acquired grid voltage root mean square value $v_{RMS}$ to the divider 53d. In the example illustrated in FIG. 2, the grid voltage root mean square value acquirer 53b acquires 630 V as the grid voltage root mean square value $v_{RMS}$ from the root mean square value calculator 51 and outputs 630 V thus acquired to the divider 53d.

The rated value acquirer 53c is connected to the storage 70 and the divider 53d. The rated value acquirer 53c acquires the rated value $v_R$ from the storage 70 and outputs the acquired rated value $v_R$ to the divider 53d. Note that the rated value $v_R$ is determined to be a predetermined value for each device as a specification, for example. In the example illustrated in FIG. 2, the rated value acquirer 53c acquires 600 V as the rated value $v_R$ from the storage 70 and outputs 600 V thus acquired to the divider 53d.

The divider 53d is connected to the grid voltage root mean square value acquirer 53b, the rated value acquirer 53c, and the upper-lower bound limiter 53e. The divider 53d acquires the grid voltage root mean square value $v_{RMS}$ from the grid voltage root mean square value acquirer 53b, acquires the rated value $v_R$ from the rated value acquirer 53c, and divides the acquired grid voltage root mean square value $v_{RMS}$ by the rated value $v_R$. Then, the divider 53d outputs a value obtained by dividing the grid voltage root mean square value $v_{RMS}$ by the rated value $v_R$ to the upper-lower bound limiter 53e.

In the example illustrated in FIG. 2, the divider 53d acquires 630 V as the grid voltage root mean square value $v_{RMS}$ from the grid voltage root mean square value acquirer 53b, acquires 600 V as the rated value $v_R$ from the rated value acquirer 53c, and divides 630 V thus acquired by 600 V. Then, the divider 53d outputs 1.05 that is a value obtained by dividing 630 V by 600 V to the upper-lower bound limiter 53e.

The upper-lower bound limiter 53e is connected to the divider 53d and the multiplier 53f. The upper-lower bound limiter 53e acquires the value obtained by dividing the grid voltage root mean square value $v_{RMS}$ by the rated value $v_R$ from the divider 53d. Then, the upper-lower bound limiter 53e compares the acquired value with an upper bound value and a lower bound value (upper and lower bound values) set to the upper-lower bound limiter 53e. When the acquired value is in the range between the upper and lower bound values, the upper-lower bound limiter 53e outputs the acquired value as a value limited by the upper-lower bound limiter 53e to the multiplier 53f. When the acquired value is out of the range between the upper and lower bound values, the upper-lower bound limiter 53e outputs, as the value limited by the upper-lower bound limiter 53e to the multiplier 53f, a value obtained by limiting the acquired value to inside of the range between the upper and lower bound values.

In the example illustrated in FIG. 2, the upper-lower bound limiter 53e acquires 1.05 that is the value obtained by dividing 630 V by 600 V from the divider 53d. Then, since 1.05 thus acquired is in the range between the upper bound value 1.1 and the lower bound value 1.0, the upper-lower bound limiter 53e outputs 1.05 thus acquired to the multiplier 53f as the value limited by the upper-lower bound limiter 53e.

Note that the upper and lower bound values set to the upper-lower bound limiter 53e may be determined to be predetermined values for each device as a specification, for example, and the lower bound value may be 1.0. Accordingly, the lower bound limiter operation value $v_{L2}$ is controlled only when the grid voltage root mean square value $v_{RMS}$ is larger than the rated value $v_R$, which can prevent the lower bound limiter operation value $v_{L2}$ from becoming smaller than the lower bound limiter set value $v_{L1}$ of MPPT reference voltage.

The multiplier 53f is connected to the lower bound limiter set value acquirer 53a, the upper-lower bound limiter 53e, and the lower bound limiter operation value outputter 53g. The multiplier 53f acquires the lower bound limiter set value $v_{L1}$ from the lower bound limiter set value acquirer 53a and acquires the value limited by the upper-lower bound limiter 53e from the upper-lower bound limiter 53e. The multiplier 53f multiplies the acquired lower bound limiter set value $v_{L1}$ by the acquired value limited by the upper-lower bound limiter 53e. The multiplier 53f outputs a value obtained by multiplying the lower bound limiter set value $v_{L1}$ by the value limited by the upper-lower bound limiter 53e to the lower bound limiter operation value outputter 53g.

In the example illustrated in FIG. 2, the multiplier 53f acquires 900 V as the lower bound limiter set value $v_{L1}$ from the lower bound limiter set value acquirer 53a and acquires 1.05 as the value limited by the upper-lower bound limiter 53e from the upper-lower bound limiter 53e. Then, the multiplier 53f outputs 945 V that is a value obtained by multiplying 900 V by 1.05 to the lower bound limiter operation value outputter 53g.

The lower bound limiter operation value outputter 53g is connected to the multiplier 53f and the limiter 54. The lower bound limiter operation value outputter 53g acquires the value obtained by multiplying the lower bound limiter set value $v_{L1}$ by the value limited by the upper-lower bound limiter 53e from the multiplier 53f and outputs the acquired value as the lower bound limiter operation value $v_{L2}$ to the limiter 54. In the example illustrated in FIG. 2, the lower bound limiter operation value outputter 53g acquires 945 V from the multiplier 53f and outputs 945 V thus acquired to the limiter 54 as the lower bound limiter operation value $v_{L2}$.

Through the above-described processing, when having acquired the information of the lower bound limiter operation value $v_{L2}$ from the limiter adjuster 53 (lower bound limiter operation value outputter 53g), the limiter 54 (refer to FIG. 1) updates the value of the DC voltage command lower bound limiter $v_L$ set to the limiter 54. Accordingly, it is possible to update the value of the DC voltage command lower bound limiter $v_L$ in accordance with the modulation rate, thereby achieving a wider operation range on the DC side than in conventional cases and stably operating the power conversion system 1 without overmodulation.

Specifically, the DC voltage command lower bound limiter $v_L$ needs to be set with consideration on the operation range of the grid voltage of the power conversion system 1, but the upper bound of the grid voltage typically needs to be up to 110% of rated voltage due to cooperative regulations among countries. However, the grid voltage is near 100% of rated voltage most of every day. Thus, for example, when the DC voltage command lower bound limiter $v_L$ is set to be higher than a device specification in advance to avoid overmodulation based on assumption of 110% of rated voltage, the operation range on the DC side becomes narrow. In the example illustrated in FIG. 2, the limiter range of MPPT voltage is 900 V to 1300 V as illustrated at the lower part of FIG. 2, but when the lower bound voltage is increased with consideration on increase of the grid voltage, the operation range becomes, for example, 990 V to 1300 V and accordingly, the operation range on the DC side becomes narrow.

However, according to the present embodiment, for example, it is possible to, in accordance with the modulation rate, increase the DC voltage command lower bound limiter $v_L$ when the grid voltage root mean square value $v_{RMS}$ has increased, and decrease the DC voltage command lower bound limiter $v_L$ when the grid voltage root mean square value $v_{RMS}$ has decreased. Accordingly, it is possible to update the value of the DC voltage command lower bound limiter $v_L$ in accordance with the modulation rate, thereby achieving a wider operation range on the DC side than in conventional cases and stably operating the power conversion system 1 without overmodulation.

Operation of First Embodiment

Figure 3:
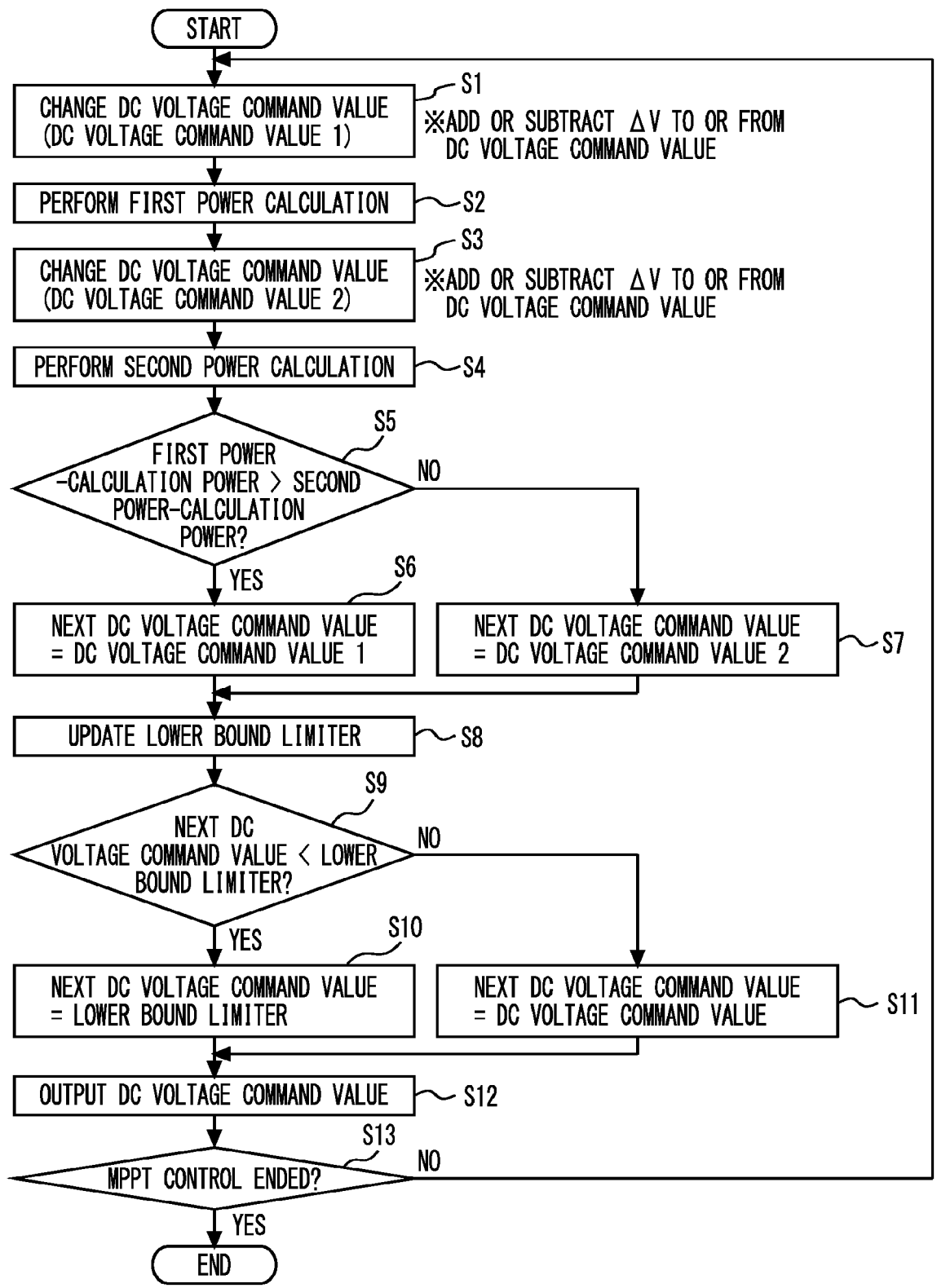
FIG. 3 is a flowchart illustrating an example of operation of an MPPT controller illustrated in FIG. 1.

FIG. 3 is a flowchart illustrating an example of operation of the MPPT controller 55 illustrated in FIG. 1. The flowchart illustrated in FIG. 3 is started when operation of the power conversion system 1 is started.

At step S1, the MPPT controller 55 calculates a DC voltage command value 1 changed to a value obtained by adding or subtracting $\Delta V$ to or from the present DC voltage command value $v^*_{DC}$. For example, the MPPT controller 55 calculates the DC voltage command value 1 changed to the value obtained by adding $\Delta V$ to the present DC voltage command value $v^*_{DC}$. Note that the addition and subtract may be performed, for example, in an order in accordance with a rule predetermined for each device or in an optional order.

At step S2, the MPPT controller 55 calculates first power-calculation power $P_1$ when the DC voltage command value $v^*_{DC}$ is the DC voltage command value 1.

At step S3, oppositely to step S1, the MPPT controller 55 calculates the DC voltage command value 1 changed to the value obtained by adding or subtracting $\Delta V$ to or from the present DC voltage command value $v^*_{DC}$. For example, when having added $\Delta V$ to the present DC voltage command value $v^*_{DC}$ at step S1, the MPPT controller 55 calculates, oppositely to step S1, a DC voltage command value 2 changed to the value obtained by subtracting $\Delta V$ from the present DC voltage command value $v^*_{DC}$. For example, when having subtracted $\Delta V$ from the present DC voltage command value $v^*_{DC}$ at step S1, the MPPT controller 55 calculates, oppositely to step S1, the DC voltage command value 2 changed to the value obtained by adding $\Delta V$ to the present DC voltage command value $v^*_{DC}$. At step S1 described above, the MPPT controller 55 has added $\Delta V$ to the present DC voltage command value $v^*_{DC}$, and thus at step S3, oppositely to step S1, the MPPT controller 55 calculates the DC voltage command value 2 changed to the value obtained by subtracting $\Delta V$ from the present DC voltage command value $v^*_{DC}$.

At step S4, the MPPT controller 55 calculates second power-calculation power $P_2$ when the DC voltage command value $v^*_{DC}$ is the DC voltage command value 2.

At step S5, the MPPT controller 55 compares the first power-calculation power $P_1$ calculated at step S2 and the second power-calculation power $P_2$ calculated at step S4 and determines whether the first power-calculation power $P_1$ is larger than the second power-calculation power $P_2$. Then, when the first power-calculation power $P_1$ is larger than the second power-calculation power $P_2$ (Yes), the MPPT controller 55 advances the processing to step S6. When the first power-calculation power $P_1$ is not larger than the second power-calculation power $P_2$ (No), the MPPT controller 55 advances the processing to step S7. In other words, when the second power-calculation power $P_2$ is larger than the first power-calculation power $P_1$, the MPPT controller 55 advances the processing to step S7.

At step S6, the MPPT controller 55 performs control to change the next DC voltage command value $v'^*_{DC}$ to the DC voltage command value 1. This is because power is larger when the next DC voltage command value $v'^*_{DC}$ is changed to the DC voltage command value 1 than when the next DC voltage command value $v'^*_{DC}$ is changed to the DC voltage command value 2.

At step S7, the MPPT controller 55 performs control to change the next DC voltage command value $v'^*_{DC}$ to the DC voltage command value 2. This is because power is larger when the next DC voltage command value $v'^*_{DC}$ is changed to the DC voltage command value 2 than when the next DC voltage command value $v'^*_{DC}$ is changed to the DC voltage command value 1.

Figure 4:
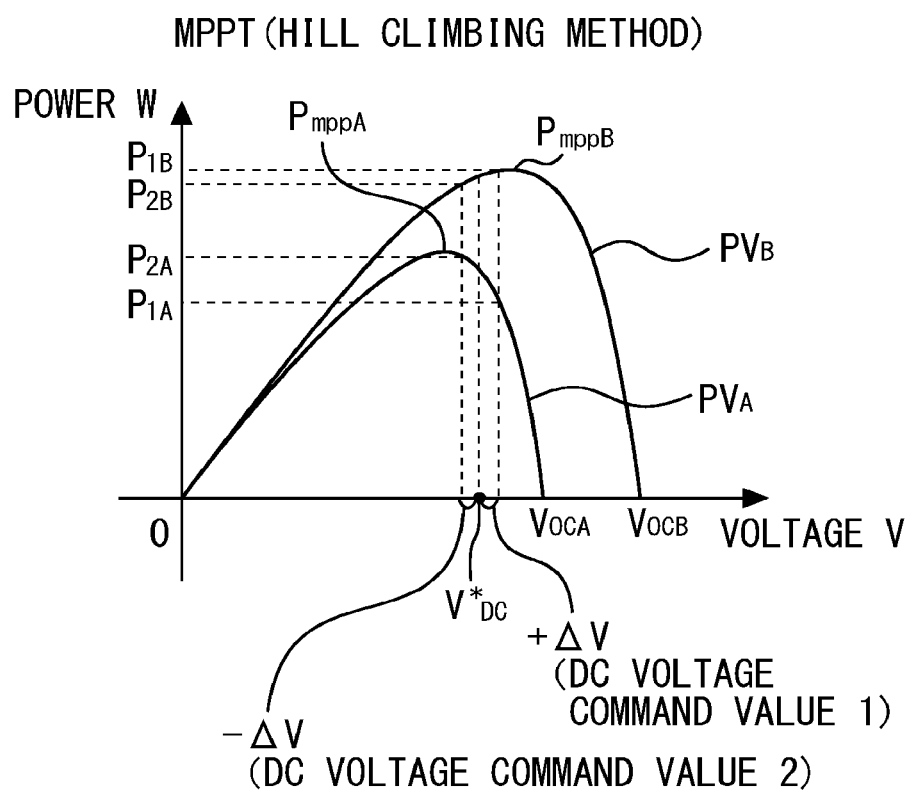
FIG. 4 is a diagram for description of an example of MPPT control based on a known hill climbing method by the MPPT controller illustrated in FIG. 1.

FIG. 4 is a diagram for description of an example of MPPT control based on a known hill climbing method by the MPPT controller 55 illustrated in FIG. 1. In FIG. 4, the vertical axis represents power P, and the horizontal axis represents voltage V. In FIG. 4, two upward curves are curves representing output characteristics when the solar battery receives light and generates power, and are called power voltage characteristic curves. Note that, in the present specification below, a power voltage characteristic curve representing output characteristics of the solar battery is also referred to as a "power voltage (PV) curve".

For example, a PV curve changes due to change of a surrounding condition such as solar irradiation or temperature for the same solar panel (solar battery panel). PV curves $PV_A$ and $PV_B$ are examples of a PV curve that has changed due to change of a surrounding condition. An optimum operation point $P_{mppA}$ on the PV curve $PV_A$ is a local maximum point at which the product of operation current and operation voltage is largest, and open voltage $V_{OCA}$ is voltage in a state in which an output terminal of the solar battery is connected to no load nor the like and opened. Similarly, an optimum operation point $P_{mppB}$ on the PV curve $PV_B$ is a local maximum point at which the product of operation current and operation voltage is largest, and open voltage $V_{OCB}$ is voltage in a state in which the output terminal of the solar battery is connected to no load nor the like and opened.

For example, the following describes a case in which the present DC voltage command value is the DC voltage command value $v*_{DC}$ when the present PV curve is the PV curve $PV_A$. In this case, the MPPT controller 55 calculates the DC voltage command value 1 obtained by adding $\Delta V$ to the present DC voltage command value $v*_{DC}$ (S1) and calculates first power-calculation power PIA in this case (S2). Thereafter, the MPPT controller 55 calculates the DC voltage command value 2 obtained by subtracting $\Delta V$ from the present DC voltage command value $v*_{DC}$ (S3) and calculates second power-calculation power $P_{2A}$ in this case (S4). Then, the MPPT controller 55 compares the power $P_{1A}$ and the power $P_{2A}$ (S5) and performs control to change the next DC voltage command value $v'*_{DC}$ to the DC voltage command value 2 since the power $P_{2A}$ is larger than the power $P_{1A}$ according to the graph (S7).

For example, when the present PV curve is the PV curve $PV_B$, the MPPT controller 55 calculates the DC voltage command value 1 obtained by adding $\Delta V$ to the present DC voltage command value $v*_{DC}$ (S1) and calculates first power-calculation power $P_{1B}$ in this case (S2). Thereafter, the MPPT controller 55 calculates the DC voltage command value 2 obtained by subtracting $\Delta V$ from the present DC voltage command value $v*_{DC}$ (S3) and calculates second power-calculation power $P_{2B}$ in this case (S4). Then, the MPPT controller 55 compares the power $P_{1B}$ and the power $P_{2B}$ (S5) and performs control to change the next DC voltage command value $v'*_{DC}$ to the DC voltage command value 1 since the power $P_{1B}$ is larger than the power $P_{2B}$ according to the graph (S6).

Accordingly, the MPPT controller 55 constantly performs, for example, the above-described MPPT control based on a known hill climbing method and thus can operate the power conversion system 1 at an optimum operation point $P_{mpp}$ at which power is constantly maximum even when the PV curve has changed due to change of a surrounding condition. In other words, the MPPT controller 55 constantly performs, for example, the above-described MPPT control based on a known hill climbing method and thus can operate the power conversion system 1 at the optimum operation point $P_{mpp}$ at which power is constantly maximum even when the position of the apex (optimum operation point $P_{mpp}$) of the PV curve has changed.

As illustrated in FIG. 3, when having acquired the information of the lower bound limiter operation value $v_{L2}$ from the limiter adjuster 53 at step S8, the limiter 54 of the MPPT controller 55 updates the value of the DC voltage command lower bound limiter $v_L$ set to the limiter 54. Note that the limiter 54 does not necessarily need to update the value of the DC voltage command lower bound limiter $v_L$ when the lower bound limiter operation value $v_{L2}$ has no variation. The limiter 54 sets the updated lower bound limiter operation value $v_{L2\ as}$ the present value of the DC voltage command lower bound limiter $v_L$. Note that the operation at step S8 is performed out of synchronization with the MPPT control performed by the MPPT controller 55 as described above with reference to, for example, FIG. 2. Thus, the operation at step S8 does not necessarily need to be performed at the timing indicated at step S8 but is performed at an optional timing.

At step S9, the MPPT controller 55 determines whether the DC voltage command value $v'*_{DC}$ determined at step S6 or S7 is smaller than the present DC voltage command lower bound limiter $v_L$ set to the limiter 54. When the DC voltage command value $v'*_{DC}$ is smaller than the DC voltage command lower bound limiter $v_L$ set to the limiter 54 (Yes), the MPPT controller 55 advances the processing to step S10. When the DC voltage command value $v'*_{DC}$ is equal to or larger than the value of the DC voltage command lower bound limiter $v_L$ set to the limiter 54 (No), the MPPT controller 55 advances the processing to step S11.

At step S10, the MPPT controller 55 determines the value of the DC voltage command lower bound limiter $v_L$ to be the next DC voltage command value $v*_{DC}$. Accordingly, overmodulation can be prevented even when the grid voltage $v_{Grid}$ (grid voltage root mean square value $v_{RMS}$) varies.

At step S11, the MPPT controller 55 determines the DC voltage command value $v'*_{DC}$ as the next DC voltage command value $v*_{DC}$. This is because no overmodulation occurs when the DC voltage command value $v*_{DC}$ is larger than the DC voltage command lower bound limiter $v_L$.

At step S12, the MPPT controller 55 outputs the DC voltage command value $v*_{DC}$ determined at step S10 or S11 to the first subtractor 56 (refer to FIG. 1).

At step S13, the MPPT controller 55 determines whether the MPPT control has ended. When having determined that the MPPT control has ended (Yes), the MPPT controller 55 ends the processing of the flowchart of FIG. 3. When having determined that the MPPT control has not ended (No), the MPPT controller 55 returns the processing to step S1 and repeats the processing at steps S1 to S13.

Figure 5:
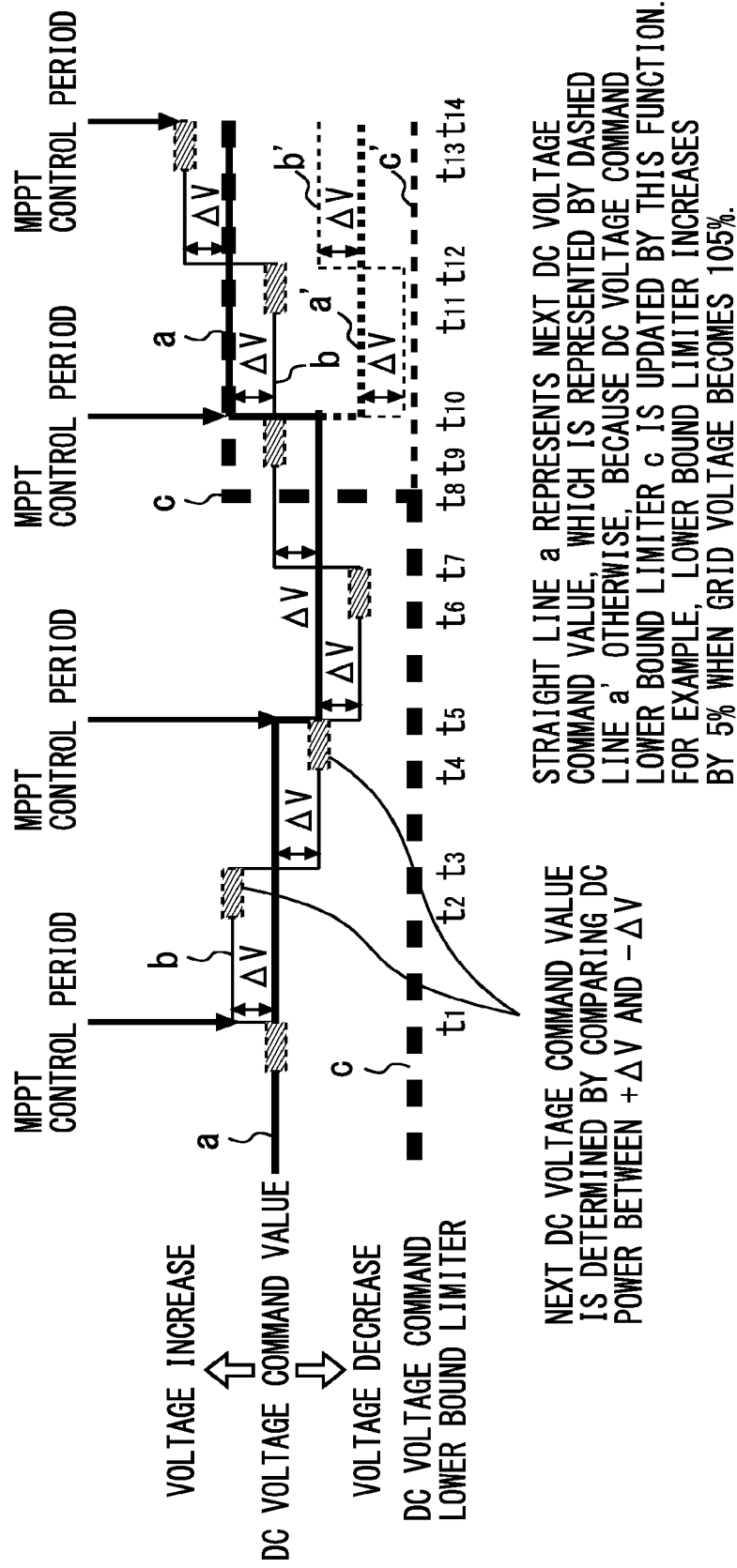
FIG. 5 is a diagram for description of an example of specific processing in the operation of the MPPT controller described with reference to FIG. 3.

FIG. 5 is a diagram for description of an example of specific processing in the operation of the MPPT controller 55 described above with reference to FIG. 3. In FIG. 5, the vertical axis represents voltage V and the horizontal axis represents time point t, and time flows from left to right. Straight line a represents the DC voltage command value $v*_{DC}$ or $v'*_{DC}$, thin straight line b represents the DC voltage command value 1 or 2, and thick dashed line c represents the DC voltage command lower bound limiter $v_L$. Dashed line a' represents the DC voltage command value $v*_{DC}$ or $v'*_{DC}$ when it is assumed that the DC voltage command lower bound limiter $v_L$ is not updated. Thin dashed line b' represents the DC voltage command value 1 or 2 when it is assumed that the DC voltage command lower bound limiter $v_L$ is not updated. Dashed line c' represents the DC voltage command lower bound limiter $v_L$ when it is assumed that the DC voltage command lower bound limiter $v_L$ is not updated.

At time point $t_1$, the MPPT controller 55 calculates the DC voltage command value 1 that is a value obtained by adding $\Delta V$ to the DC voltage command value $v*_{DC}$.

At time point $t_2$, the MPPT controller 55 calculates the first power-calculation power $P_1$ when the DC voltage command value $v*_{DC}$ is the DC voltage command value 1.

At time point $t_3$, the MPPT controller 55 calculates the DC voltage command value 2 that is a value obtained by subtracting $\Delta V$ from the DC voltage command value $V*_{DC}$.

At time point $t_4$, the MPPT controller 55 calculates the second power-calculation power $P_2$ when the DC voltage command value $v*_{DC}$ is the DC voltage command value 2.

At time point $t_5$ (MPPT control period), the MPPT controller 55 compares the power $P_1$ and the power $P_2$ and determines that the power $P_2$ is larger than the power $P_1$, and thus performs control to change the next DC voltage command value $v'^*_{DC}$ to the DC voltage command value 2. Since the changed DC voltage command value $v'^*_{DC}$ is larger than the DC voltage command lower bound limiter $v_L$, the MPPT controller 55 determines the DC voltage command value $v'^*_{DC}$ to be the next DC voltage command value $v^*_{DC}$. The MPPT controller 55 outputs the determined DC voltage command value $v^*_{DC}$ to the first subtractor 56 (refer to FIG. 1). Simultaneously, at time point $t_5$, the MPPT controller 55 calculates the DC voltage command value 1 that is a value obtained by subtracting $\Delta V$ from the DC voltage command value $v^*_{DC}$.

At time point $t_6$, the MPPT controller 55 calculates the first power-calculation power $P_1$ when the DC voltage command value $v^*_{DC}$ is the DC voltage command value 1.

At time point $t_7$, the MPPT controller 55 calculates the DC voltage command value 2 that is a value obtained by adding $\Delta V$ to the DC voltage command value $v^*_{DC}$.

At time point $t_8$ (at a timing out of synchronization with the MPPT control, by the limiter adjuster 53), the value of the DC voltage command lower bound limiter $v_L$ set to the limiter 54 is updated. For example, when the grid voltage root mean square value $v_{RMS}$ is 105%, the value of the DC voltage command lower bound limiter $v_L$ set to the limiter 54 is updated to increase by 5%.

At time point $t_9$, the MPPT controller 55 calculates the second power-calculation power $P_2$ when the DC voltage command value $v^*_{DC}$ is the DC voltage command value 2.

At time point $t_{10}$ (MPPT control period), the MPPT controller 55 compares the power $P_1$ and the power $P_2$ and determines that the power $P_1$ is larger than the power $P_2$, and thus performs control to change the next DC voltage command value $v'^*_{DC}$ to the DC voltage command value 1 (dashed line a'). However, since the changed DC voltage command value $v'^*_{DC}$ (dashed line a') is smaller than the DC voltage command lower bound limiter $v_L$ (thick dashed line c), the MPPT controller 55 determines the value of the DC voltage command lower bound limiter $v_L$ to be the next DC voltage command value $v^*_{DC}$. The MPPT controller 55 outputs the determined DC voltage command value $v^*_{DC}$ to the first subtractor 56 (refer to FIG. 1). Simultaneously at time point $t_{10}$, the MPPT controller 55 calculates the DC voltage command value 1 that is a value obtained by subtracting $\Delta V$ from the DC voltage command value $v^*_{DC}$ (straight line a) having increased to the value of the DC voltage command lower bound limiter $v_L$.

At time point $t_{11}$, the MPPT controller 55 calculates the first power-calculation power $P_1$ when the DC voltage command value $v^*_{DC}$ is the DC voltage command value 1.

At time point $t_{12}$, the MPPT controller 55 calculates the DC voltage command value 2 that is a value obtained by adding $\Delta V$ to the DC voltage command value $v^*_{DC}$ (straight line a) having increased to the value of the DC voltage command lower bound limiter $v_L$.

At time point $t_{13}$, the MPPT controller 55 calculates the second power-calculation power $P_2$ when the DC voltage command value $v^*_{DC}$ is the DC voltage command value 2.

At time point $t_{14}$ (MPPT control period) and later, the MPPT controller 55 repeats the above-described processing.

Note that, when the DC voltage command lower bound limiter $v_L$ is not updated, the MPPT controller 55 determines that the changed DC voltage command value $v'^*_{DC}$ (dashed line a') is larger than the DC voltage command lower bound limiter $v_L$ (dashed line c') at time point $t_{10}$ (MPPT control period). In this case, the MPPT controller 55 determines the DC voltage command value $v'^*_{DC}$ (dashed line a') to be the next DC voltage command value $v^*_{DC}$.

In this case, overmodulation potentially occurs and the power conversion system 1 potentially cannot stably operate, for example, when the grid voltage root mean square value $v_{RMS}$ is 105%. Furthermore, the operation range on the DC side is narrow when the DC voltage command lower bound limiter $v_L$ is set to be high in advance to avoid overmodulation.

However, according to the present embodiment, since the DC voltage command lower bound limiter $v_L$ is updated in accordance with the modulation rate, it is possible to stably operate the power conversion system 1 without overmodulation while not narrowing the operation range on the DC side.

Effects of First Embodiment

As described above, according to the first embodiment illustrated in FIGS. 1 to 5, it is possible to update the DC voltage command lower bound limiter $v_L$ in accordance with the modulation rate, thereby achieving a wider operation range on the DC side than in conventional cases and stably operating the power conversion system 1 without overmodulation.

In addition, according to the first embodiment illustrated in FIGS. 1 to 5, the update of the DC voltage command lower bound limiter $v_L$ is performed by the modulation rate calculator 52 and the limiter adjuster 53, separately from the MPPT controller 55. In other words, the control to update the DC voltage command lower bound limiter $v_L$ and the MPPT control are independently performed in parallel by separate components. Thus, the MPPT controller 55 only needs to determine whether the DC voltage command value $v'^*_{DC}$ is smaller than the DC voltage command lower bound limiter $v_L$ set to the limiter 54, which simplifies the control by the MPPT controller 55. Moreover, the MPPT control by the MPPT controller 55 is not affected by the control to update the DC voltage command lower bound limiter $v_L$. Furthermore, since the control to update the DC voltage command lower bound limiter $v_L$ and the MPPT control are performed out of synchronization, the control to update the DC voltage command lower bound limiter $v_L$ can be swiftly performed at a correct timing in accordance with the modulation rate.

Configuration of Second Embodiment

Figure 6:
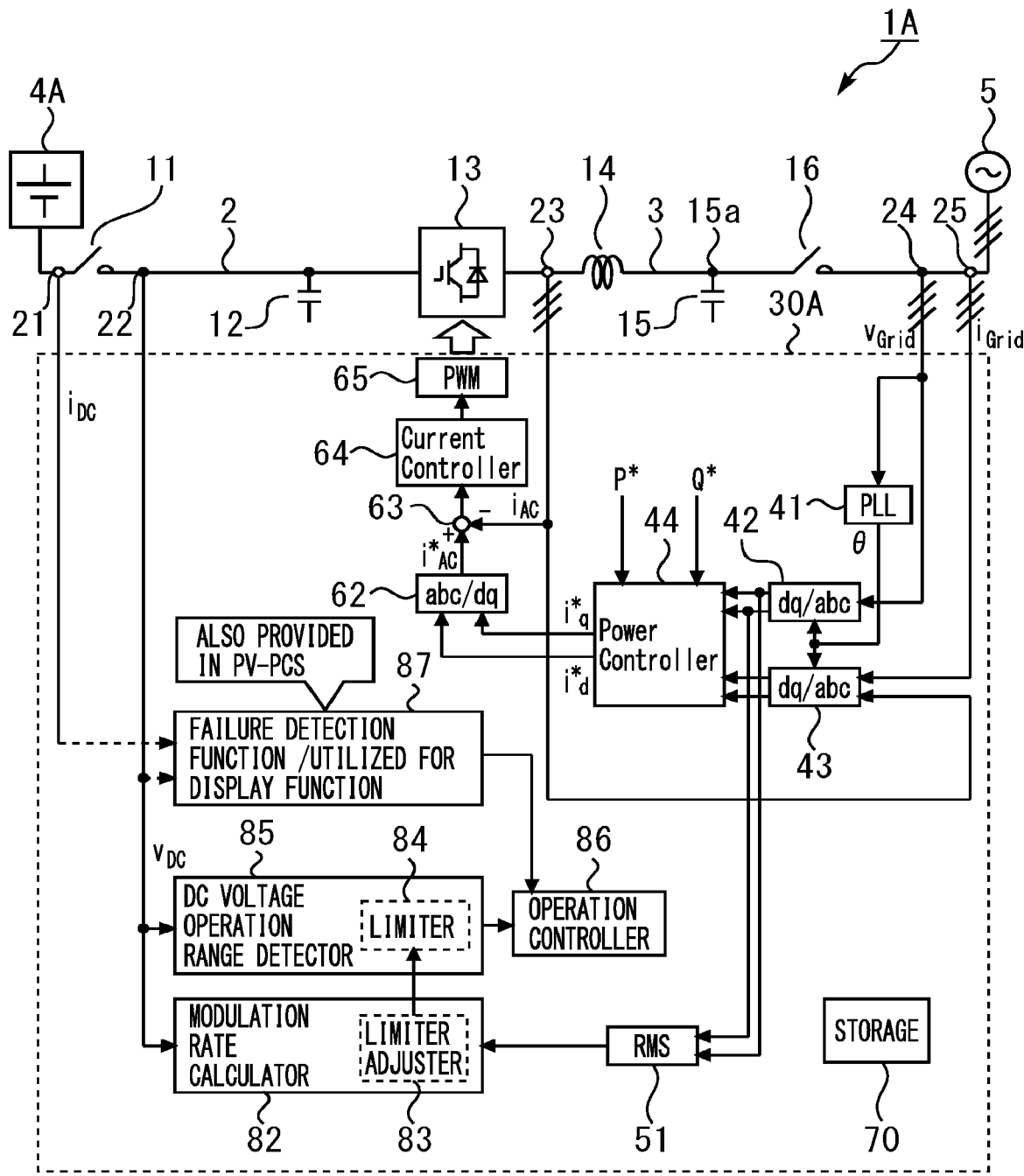
FIG. 6 is a diagram illustrating an example of the configuration of a control device and a power conversion system according to a second embodiment.

FIG. 6 is a diagram illustrating an example of the configuration of a control device 30A and a power conversion system 1A according to a second embodiment. Note that, in FIG. 6, any component identical or similar to a component illustrated in FIG. 1 is denoted by the same reference sign, and detailed description thereof is omitted or simplified. In FIG. 6, the power conversion system 1A is connected to an energy storage system 4A through the DC bus 2 on the one end side (input side) on the left side in FIG. 1.

For example, the power conversion system (PCS) 1A converts DC power supplied from the energy storage system 4A into AC power and outputs the converted AC power to the AC power grid 5 side (the AC side). In other words, the power conversion system 1A in the present embodiment is an energy-storage-system (ESS) power conversion system (ESS-PCS: Energy Storage System-Power Conditioning System). Hereinafter, in the present specification, the power conversion system 1A is also referred to as the "ESS-PCS 1A" or simply as the "PCS 1A".

The energy storage system 4A is connected to the DC end (input end) of the inverter 13 through the DC bus 2. The energy storage system 4A is also referred to as, for example, a secondary battery or a battery and is a chemical battery that can be repeatedly used through charging and discharging and can supply stored power as necessary. The energy storage system 4A may be, for example, a lead battery, a nickel-cadmium battery, a nickel-hydrogen battery, or a lithium-ion battery. The energy storage system 4A supplies stored DC power to the inverter 13 through the DC bus 2. Note that, in the present specification below, the energy storage system 4A is also referred to as the "ESS 4A".

As illustrated in FIG. 6, the control device 30A includes components or functions as a modulation rate calculator 82, a limiter adjuster 83, a limiter 84, a DC voltage operation range detector 85, an operation controller 86, and a failure detector 87. Note that each above-described component or function may be implemented by a computer program executed by the processor 91 (refer to FIG. 9) to be described later in the processing circuit 90 (refer to FIG. 9) included in the control device 30A and to be described later or may be implemented by the hardware component 93 (refer to FIG. 9) to be described later. The control device 30A executes a predetermined computer program and performs processing below with each above-described component or function.

The modulation rate calculator 82 is connected to the first voltage sensor 22 and the root mean square value calculator 51. The modulation rate calculator 82 acquires information of the DC voltage $v_{DC}$ that is a value detected by the first voltage sensor 22 and information of the grid voltage root mean square value $v_{RMS}$ from the root mean square value calculator 51. The modulation rate calculator 82 calculates the modulation rate based on the information of the DC voltage $v_{DC}$ and the information of the grid voltage root mean square value $v_{RMS}$ thus acquired. Note that the modulation rate calculator 82 may calculate the modulation rate constantly or at each predetermined interval or may calculate the modulation rate at optional timings.

The modulation rate calculator 82 includes the limiter adjuster 83 and outputs, for example, the calculated modulation rate to the limiter adjuster 83. Note that the modulation rate calculator 82 may output information of whether the calculated modulation rate exceeds one (modulation rate >100%) to the limiter adjuster 83. Alternatively, only when the calculated modulation rate exceeds one (modulation rate >100%), the modulation rate calculator 82 may output the calculated modulation rate or information that the calculated modulation rate exceeds one (modulation rate >100%) to the limiter adjuster 83.

The limiter adjuster 83 is provided as, for example, part of the modulation rate calculator 82 and is connected to the root mean square value calculator 51 through the modulation rate calculator 82 and also connected to the limiter 84 through the DC voltage operation range detector 85. The limiter adjuster 83 is also connected to the storage 70 although wires are omitted in the drawing. The limiter adjuster 83 acquires information of the modulation rate from the modulation rate calculator 82 and acquires information of an operation range lower bound voltage set value $v_{L3}$ and information of the rated value $v_R$ from the storage 70.

The limiter adjuster 83 calculates an operation range lower bound voltage operation value $v_{L4}$ based on the operation range lower bound voltage set value $v_{L3}$, the rated value $v_R$, and the grid voltage root mean square value $v_{RMS}$ thus acquired. Note that the limiter adjuster 83 constantly performs the calculation and updates (calculates) the operation range lower bound voltage operation value $v_{L4}$ whether the modulation rate exceeds one (modulation rate >100%) or does not exceed one (modulation rate≤100%). Then, the limiter adjuster 83 outputs the calculated operation range lower bound voltage operation value $v_{L4}$ to the limiter 84. As a result, the modulation rate eventually becomes smaller than one.

Note that the limiter adjuster 83 does not necessarily need to output the operation range lower bound voltage operation value $v_{L4}$ to the limiter 84 when the operation range lower bound voltage operation value $v_{L4}$ has no change as a result of the calculation. Alternatively, the limiter adjuster 83 may output the operation range lower bound voltage operation value $v_{L4}$ to the limiter 84 constantly, at each predetermined interval, or at optional timings irrespective of the existence of variation in the modulation rate and the existence of variation in the operation range lower bound voltage operation value $v_{L4}$.

Note that the modulation rate calculator 82 and the limiter adjuster 83 are not limited to the configuration illustrated in FIG. 6, but the modulation rate calculator 82 and the limiter adjuster 83 may be an integrated component or completely separate components, or the limiter adjuster 83 may include the modulation rate calculator 82.

The limiter 84 is provided as, for example, part of the DC voltage operation range detector 85 and is connected to the limiter adjuster 83 through the modulation rate calculator 82. The limiter 84 acquires information of the operation range lower bound voltage operation value $v_{L4}$ from the limiter adjuster 83. Note that the limiter 84 may acquire the information of the operation range lower bound voltage operation value $v_{L4}$ from the limiter adjuster 83 only when the operation range lower bound voltage operation value $v_{L4}$ has varied. Alternatively, the limiter 84 may acquire the information of the operation range lower bound voltage operation value $v_{L4}$ from the limiter adjuster 83 constantly, at each predetermined interval, or at optional timings.

When having acquired the information of the operation range lower bound voltage operation value $v_{L4}$ from the limiter adjuster 83, the limiter 84 updates the value of an operation range lower bound voltage $v_{L4}$ set to the limiter 84. Accordingly, the value of the operation range lower bound voltage $v_{L4}$ is updated in accordance with the modulation rate. Note that the limiter 84 does not necessarily need to update the value of the operation range lower bound voltage $v_{L4}$ when the operation range lower bound voltage operation value $v_{L4}$ has no variation. The limiter 84 sets the updated operation range lower bound voltage operation value $v_{L4}$ as the present value of the operation range lower bound voltage $v_{L4}$.

The DC voltage operation range detector 85 is connected to the first voltage sensor 22 and the operation controller 86. The DC voltage operation range detector 85 acquires the information of the DC voltage $v_{DC}$ that is a value detected by the first voltage sensor 22. The DC voltage operation range detector 85 compares the acquired information of the DC voltage $v_{DC}$ and the present operation range lower bound voltage $v_{L4}$ set to the limiter 84. The DC voltage operation range detector 85 determines whether the acquired DC voltage $v_{DC}$ is smaller than the operation range lower bound voltage $v_{L4}$ set to the limiter 84 as a result of the comparison, and outputs information of a result of the determination to the operation controller 86. When the acquired DC voltage $v_{DC}$ is smaller than the operation range lower bound voltage $v_{L4}$ set to the limiter 84 as a result of the comparison, the DC voltage operation range detector 85 outputs information that the DC voltage $v_{DC}$ is smaller than the operation range lower bound voltage $v_{L4}$ to the operation controller 86. When the acquired DC voltage $v_{DC}$ is a value equal to or larger than the operation range lower bound voltage $v_{L4}$ set to the limiter 84 as a result of the comparison, the DC voltage operation range detector 85 outputs information that the DC voltage $v_{DC}$ is equal to or larger than the operation range lower bound voltage $v_{L4}$ to the operation controller 86. Note that the DC voltage operation range detector 85 may output nothing to the operation controller 86 when the acquired DC voltage $v_{DC}$ is equal to or larger than the operation range lower bound voltage $v_{L4}$ set to the limiter 84 as a result of the comparison.

The operation controller 86 is connected to the DC voltage operation range detector 85, the failure detector 87, and each component of the power conversion system 1A although wires are omitted in the drawing. The operation controller 86 acquires information of whether the DC voltage $v_{DC}$ is smaller than the operation range lower bound voltage $v_{L4}$ from the DC voltage operation range detector 85. The operation controller 86 also acquires, from the failure detector 87, for example, information of whether failure or anomaly of the power conversion system 1A is detected.

When having acquired the information that the DC voltage $v_{DC}$ is smaller than the operation range lower bound voltage $v_{L4}$ or when having acquired the information that failure or anomaly of the power conversion system 1A is detected, the operation controller 86 outputs, to each connected component, an operation instruction to stop the power conversion system 1A for protection. For example, when having acquired these pieces of information, the operation controller 86 outputs an operation instruction to perform gate block (GB) of the inverter 13 and cuts (or stops) the power conversion system 1A off the entire grid. Alternatively, for example, when having acquired these pieces of information, the operation controller 86 may output an operation instruction to display an alert (alarm) on, for example, a non-illustrated display unit or may output an operation instruction to open (cutoff) the DC switch 11 and the AC switch 16.

Note that when not having acquired the information that the DC voltage $v_{DC}$ is smaller than the operation range lower bound voltage $v_{L4}$ nor the information that failure or anomaly of the power conversion system 1A is detected or when having acquired no information, the operation controller 86 outputs no operation instruction to each connected component. In this case, the inverter 13 is not subjected to gate block (GB) nor the like, but operation of the power conversion system 1A continues.

The failure detector 87 is connected to the first current sensor 21, the first voltage sensor 22, and the operation controller 86. The failure detector 87 acquires information of the DC current $i_{DC}$ that is a value detected by the first current sensor 21 and the information of the DC voltage $v_{DC}$ that is a value detected by the first voltage sensor 22. The failure detector 87 is utilized for a failure detection function and a display function. Note that, although not illustrated, the failure detector 87 is also included in the PV-PCS 1 illustrated in FIG. 1.

The failure detector 87 determines whether, for example, the acquired DC current $i_{DC}$ or DC voltage $v_{DC}$ exceeds a predetermined threshold. When having determined that, for example, the acquired DC current $i_{DC}$ or DC voltage $v_{DC}$ exceeds the predetermined threshold, the failure detector 87, determines that failure or anomaly has occurred to the power conversion system 1A, and outputs information that failure or anomaly of the power conversion system 1A is detected to the operation controller 86. When having determined that, for example, the acquired DC current $i_{DC}$ or DC voltage $v_{DC}$ is equal to or smaller than the predetermined threshold, the failure detector 87 determines that no failure nor anomaly has occurred to the power conversion system 1A, and may output information of the determination to the operation controller 86 or may output nothing.

Note that although the operation controller 86 and the failure detector 87 are separated from each other in FIG. 6, the operation controller 86 and the failure detector 87 may be integrated. In this case, when having detected failure or anomaly of the power conversion system 1A, the failure detector 87 may output, to the failure detector 87 itself, an operation instruction to perform gate block (GB) of the inverter 13 or the like. Moreover, although the DC voltage operation range detector 85 and the operation controller 86 are separated from each other in FIG. 6, the DC voltage operation range detector 85 and the operation controller 86 may be integrated. In this case, when having determined that the DC voltage $v_{DC}$ is smaller than the operation range lower bound voltage $v_{L4}$, the DC voltage operation range detector 85 may output, to the DC voltage operation range detector 85 itself, an operation instruction to perform gate block (GB) of the inverter 13 or the like.

Figure 7:
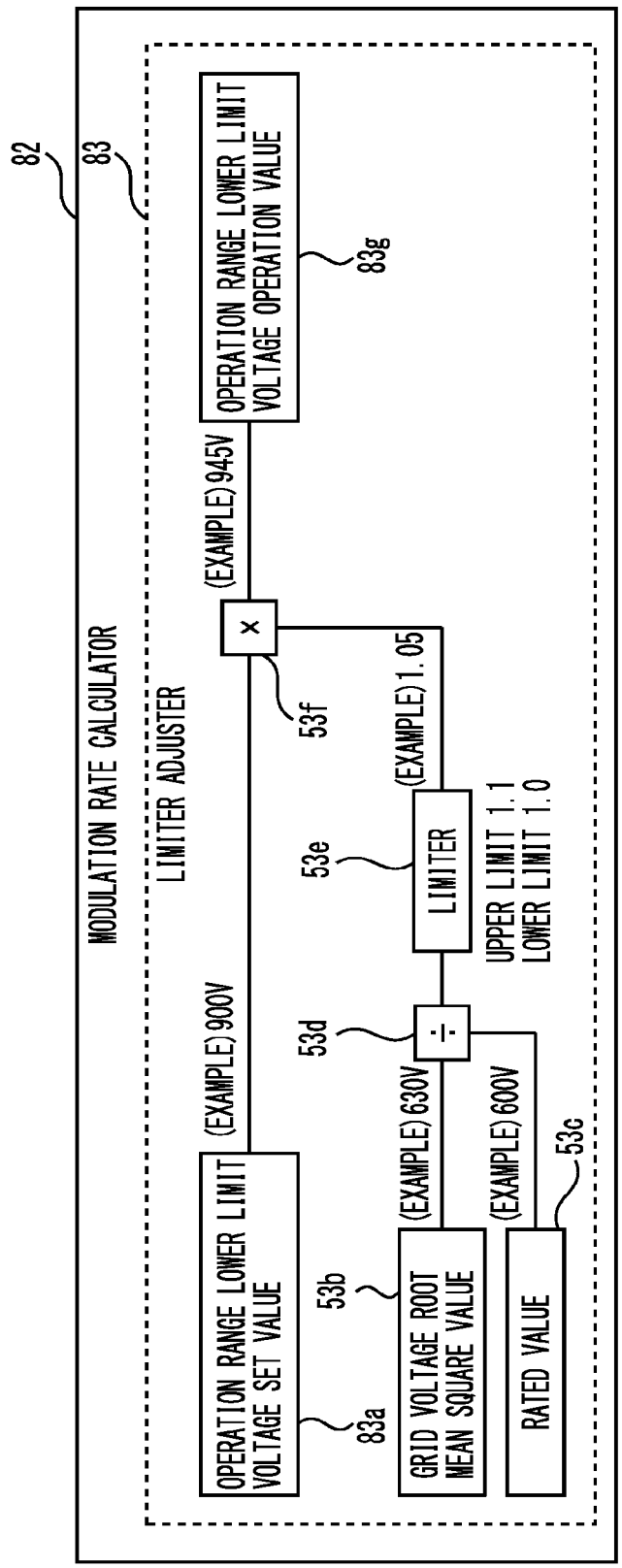
FIG. 7 is a diagram illustrating an example of the configuration and processing of a modulation rate calculator and a limiter adjuster illustrated in FIG. 6.

FIG. 7 is a diagram illustrating an example of the configuration and processing of the modulation rate calculator 82 and the limiter adjuster 83 illustrated in FIG. 6. Note that, in FIG. 7, any component identical or similar to a component illustrated in FIG. 2 is denoted by the same reference sign, and detailed description thereof is omitted or simplified.

Although wires are omitted in the drawing, the modulation rate calculator 82 is connected to the first voltage sensor 22 and the root mean square value calculator 51 as described above with reference to FIG. 6, acquires the information of the DC voltage $v_{DC}$ from the first voltage sensor 22, and acquires the information of the grid voltage root mean square value $v_{RMS}$ from the root mean square value calculator 51. The modulation rate calculator 82 calculates the modulation rate based on the information of the DC voltage $v_{DC}$ and the information of the grid voltage root mean square value $v_{RMS}$ thus acquired. The method of calculating the modulation rate is the same as the method described above with reference to FIG. 2, and thus detailed description thereof will be omitted.

Although wires are omitted in the drawing, the limiter adjuster 83 is connected to the root mean square value calculator 51, the limiter 84, and the storage 70 as described above with reference to FIG. 6. The limiter adjuster 83 includes, for example, an operation range lower bound voltage set value acquirer 83a, the grid voltage root mean square value acquirer 53b, the rated value acquirer 53c, the divider 53d, the upper-lower bound limiter 53e, the multiplier 53f, and an operation range lower bound voltage operation value outputter 83g.

The operation range lower bound voltage set value acquirer 83a is connected to the storage 70 and the multiplier 53f. The operation range lower bound voltage set value acquirer 83a acquires the operation range lower bound voltage set value $v_{L3}$ from the storage 70 and outputs the acquired operation range lower bound voltage set value $v_{L3}$ to the multiplier 53f. Note that the operation range lower bound voltage set value $v_{L3}$ is determined to be a predetermined value for each device as a specification, for example. In the example illustrated in FIG. 7, the operation range lower bound voltage set value acquirer 83a acquires 900 V as the operation range lower bound voltage set value $v_{L3}$ from the storage 70 and outputs 900 V thus acquired to the multiplier 53$f$.

The operation range lower bound voltage operation value outputter 83$g$ is connected to the multiplier 53$f$ and the limiter 84. The operation range lower bound voltage operation value outputter 83$g$ acquires, from the multiplier 53$f$, a value obtained by multiplying the operation range lower bound voltage set value $v_{L3}$ by the value limited by the upper-lower bound limiter 53$e$ and outputs the acquired value as the operation range lower bound voltage operation value $v_{L4}$ to the limiter 84. In the example illustrated in FIG. 7, the operation range lower bound voltage operation value outputter 83$g$ acquires 945 V from the multiplier 53$f$ and outputs 945 V thus acquired as the operation range lower bound voltage operation value $v_{L4}$ to the limiter 84.

Through the above-described processing, when having acquired the information of the operation range lower bound voltage operation value $v_{L4}$ from the limiter adjuster 83 (operation range lower bound voltage operation value outputter 83$g$), the limiter 84 (refer to FIG. 6) updates the value of the operation range lower bound voltage $v_{L4}$ set to the limiter 84. Accordingly, it is possible to update the value of the operation range lower bound voltage $v_{L4}$ in accordance with the modulation rate, thereby achieving a wider operation range on the DC side than in conventional cases and stably operating the power conversion system 1A without overmodulation.

Specifically, for example, the operation range lower bound voltage $v_{L4}$ needs to be set in accordance with specifications of the energy storage system 4A and the power conversion system 1A. However, for example, when the operation range lower bound voltage $v_{L4}$ is set to be higher than the specifications of the energy storage system 4A and the power conversion system 1A in advance to avoid overmodulation, the operation range on the DC side becomes narrow. In the example illustrated in FIG. 7, the operation range of the ESS-PCS 1A is 900 V to 1300 V as illustrated at a lower part of FIG. 7, but when the lower bound voltage is increased with consideration on increase of the grid voltage, the operation range becomes, for example, 990 V to 1300 V and accordingly, the operation range on the DC side becomes narrow.

However, according to the present embodiment, for example, it is possible to, in accordance with the modulation rate, increase the operation range lower bound voltage $v_{L4}$ when the grid voltage root mean square value $v_{RMS}$ has increased, and decrease the operation range lower bound voltage $v_{L4}$ when the grid voltage root mean square value $v_{RMS}$ has decreased. Accordingly, it is possible to update the value of the operation range lower bound voltage $v_{L4}$ in accordance with the modulation rate, thereby achieving a wider operation range on the DC side than in conventional cases (without narrowing the operation range on the DC side) and stably operating the power conversion system 1A without overmodulation.

Operation of Second Embodiment

Figure 8:
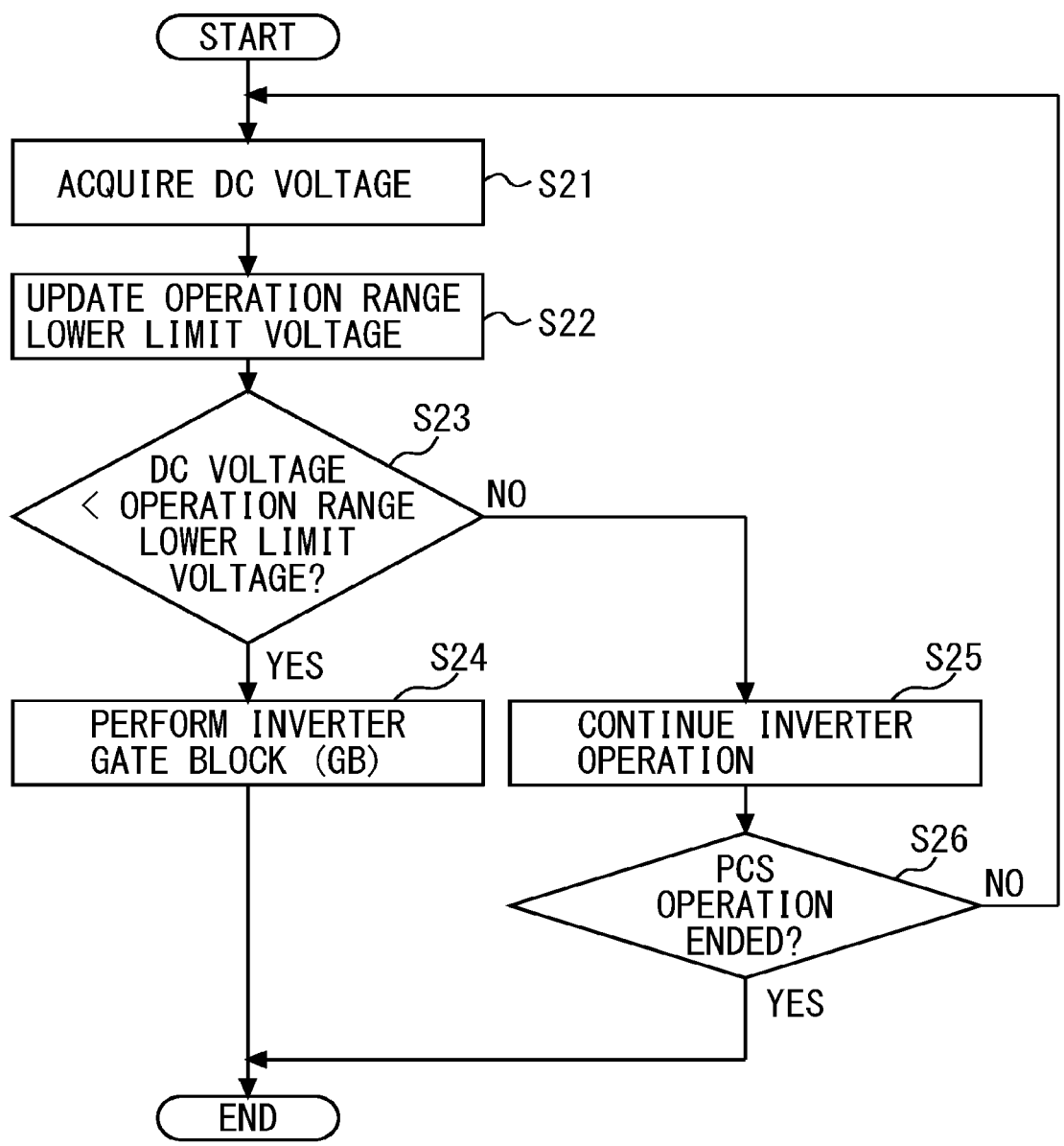
FIG. 8 is a flowchart illustrating an example of operation of a DC voltage operation range detector and an operation controller illustrated in FIG. 6.

FIG. 8 is a flowchart illustrating an example of operation of the DC voltage operation range detector 85 and the operation controller 86 illustrated in FIG. 6. The flowchart illustrated in FIG. 8 is started when operation of the power conversion system 1A (DC power supply from the energy storage system 4A) is started.

At step S21, the DC voltage operation range detector 85 acquires the information of the DC voltage $v_{DC}$ that is a value detected by the first voltage sensor 22 from the first voltage sensor 22.

At step S22, when having acquired the information of the operation range lower bound voltage operation value $v_{L4}$ from the limiter adjuster 83, the limiter 84 of the DC voltage operation range detector 85 updates the value of the operation range lower bound voltage $v_{L4}$ set to the limiter 84. Note that the limiter 84 does not necessarily need to update the value of the operation range lower bound voltage $v_{L4}$ when the operation range lower bound voltage operation value $v_{L4}$ has no variation. The limiter 84 sets the present value of the operation range lower bound voltage $v_{L4}$ to the updated operation range lower bound voltage operation value $v_{L4}$. Note that the operation at step S22 is performed out of synchronization with the operation performed by the DC voltage operation range detector 85. Thus, the operation at step S22 does not necessarily need to be performed at the timing indicated at step S22 but is performed at optional timings.

At step S23, the DC voltage operation range detector 85 determines whether the DC voltage $v_{DC}$ acquired at step S21 is smaller than the present operation range lower bound voltage $v_{L4}$ set to the limiter 84. When the DC voltage $v_{DC}$ is smaller than the operation range lower bound voltage $v_{L4}$ set to the limiter 84 (Yes), the DC voltage operation range detector 85 advances the processing to step S24. When the DC voltage $v_{DC}$ is equal to or larger than the value of the operation range lower bound voltage $v_{L4}$ set to the limiter 84 (No), the DC voltage operation range detector 85 advances the processing to step S25.

At step S24, the operation controller 86 acquires the information that the DC voltage $v_{DC}$ is smaller than the operation range lower bound voltage $v_{L4}$ from the DC voltage operation range detector 85. In this case, for example, the operation controller 86 outputs an operation instruction to perform gate block (GB) of the inverter 13 and cuts (or stops) the power conversion system 1A off the entire grid. Then, the DC voltage operation range detector 85 and the operation controller 86 end the processing of the flowchart of FIG. 8.

At step S25, the operation controller 86 acquires, from the DC voltage operation range detector 85, information that the DC voltage $v_{DC}$ is equal to or larger than the operation range lower bound voltage $v_{L4}$. Alternatively, the operation controller 86 acquires no information from the DC voltage operation range detector 85. In this case, the operation controller 86 outputs no operation instruction to each connected component. Accordingly, the inverter 13 is not subjected to gate block (GB) nor the like, but operation of the inverter 13 (power conversion system 1A) continues.

At step S26, the DC voltage operation range detector 85 determines whether the operation of the ESS-PCS 1A (DC power supply from the energy storage system 4A) has ended. When having determined that the operation of the ESS-PCS 1A (DC power supply from the energy storage system 4A) has ended (Yes), the DC voltage operation range detector 85 ends the processing of the flowchart of FIG. 8. When having determined that the operation of the ESS-PCS 1A (DC power supply from the energy storage system 4A) has not ended (No), the DC voltage operation range detector 85 returns the processing to step S21 and repeats the processing at steps S21 to S26.

Effects of Second Embodiment

As described above, according to the second embodiment illustrated in FIGS. 6 to 8, it is possible to update the operation range lower bound voltage $v_{L4}$ in accordance with the modulation rate, thereby achieving a wider operation range on the DC side than in conventional cases and stably operating the power conversion system 1A without overmodulation.

In a case of the ESS-PCS 1A, the DC voltage $v_{DC}$ is used to monitor the device operation range, and according to the second embodiment illustrated in FIGS. 6 to 8, the operation range lower bound voltage $v_{L4}$ is variable in accordance with the modulation rate. Thus, it is possible to prevent the operation range on the DC side from becoming narrower than the specifications of the energy storage system 4A and the power conversion system 1A and stably operate the power conversion system 1A without overmodulation.

In addition, according to the second embodiment illustrated in FIGS. 6 to 8, the update of the operation range lower bound voltage $v_{L4}$ is performed by the modulation rate calculator 82 and the limiter adjuster 83, separately from the DC voltage operation range detector 85. In other words, the control to update the operation range lower bound voltage $v_{L4}$ and the control by the DC voltage operation range detector 85 are independently performed in parallel by separate components. Thus, the DC voltage operation range detector 85 only needs to determine whether the DC voltage $v_{DC}$ is smaller than the operation range lower bound voltage $v_{L4}$ set to the limiter 84, which simplifies the control by the DC voltage operation range detector 85. Furthermore, the DC voltage $v_{DC}$ varies with the remaining charge amount of the energy storage system 4A and the like, and accordingly, the control by the DC voltage operation range detector 85 is not affected by the control to update the operation range lower bound voltage $v_{L4}$. Moreover, since the control to update the operation range lower bound voltage $v_{L4}$ and the control by the DC voltage operation range detector 85 are performed out of synchronization, the control to update the operation range lower bound voltage $v_{L4}$ can be swiftly performed at a correct timing in accordance with the modulation rate.

<Example of Hardware Configuration>

Figure 9:
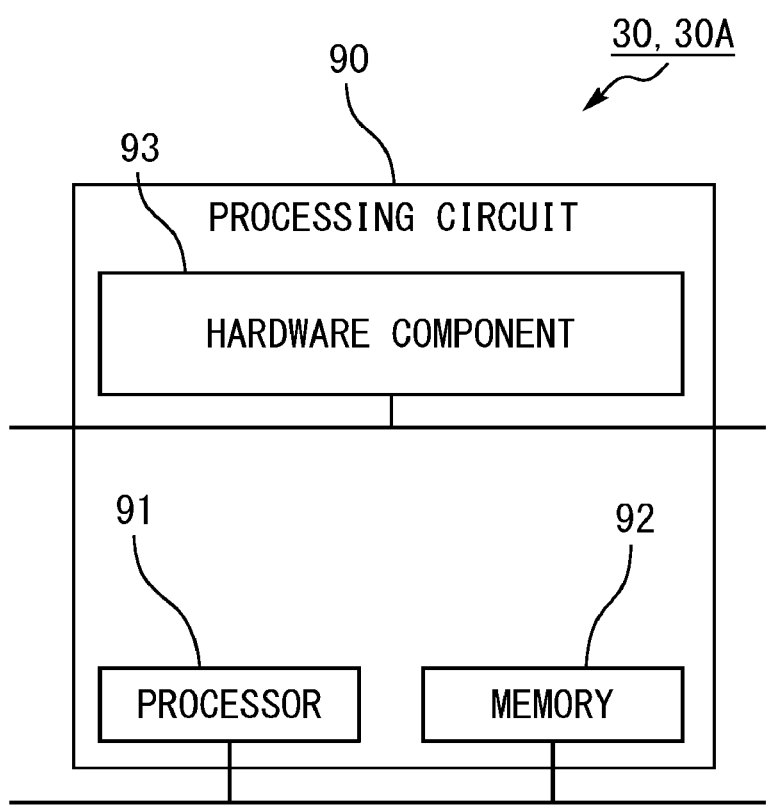
FIG. 9 is a conceptual diagram illustrating an example of a hardware configuration of a processing circuit included in the control device in each embodiment illustrated in FIGS. 1 to 8.

FIG. 9 is a conceptual diagram illustrating an example of a hardware configuration of the processing circuit 90 included in the control devices 30 and 30A in the embodiments illustrated in FIGS. 1 to 8. Each above-described function is implemented by the processing circuit 90. In an aspect, the processing circuit 90 includes at least one processor 91 and at least one memory 92. In another aspect, the processing circuit 90 includes at least one dedicated hardware component 93.

When the processing circuit 90 includes the processor 91 and the memory 92, each function is implemented by software, firmware, or combination of software and firmware. At least one of the software and the firmware is written as a computer program. The at least one of the software and the firmware is stored in the memory 92. The processor 91 implements each function by reading and executing the computer program stored in the memory 92.

When the processing circuit 90 includes the dedicated hardware component 93, the processing circuit 90 is, for example, a single circuit, a composite circuit, a programmed processor, or combination thereof. Each function is implemented by the processing circuit 90.

Some or all functions of the control devices 30 and 30A may be implemented by hardware or may be implemented by a computer program executed by a processor. In other words, the control devices 30 and 30A may be implemented by a computer and a computer program, and the computer program may be stored in a storage medium or provided through a network.

Supplementary Notes of Embodiments

As described above, the embodiments illustrated in FIGS. 1 to 9 are the first embodiment illustrated in FIGS. 1 to 5 and the second embodiment illustrated in FIGS. 6 to 8, but these embodiments may be combined in series or in parallel. Specifically, the power conversion system 1 or 1A may include both the solar panel 4 and the energy storage system 4A or may be applied to both. The combined embodiments can achieve the same effects as those of the embodiments not combined.

In the embodiments illustrated in FIGS. 1 to 9, the power conversion systems 1 and 1A and the control devices 30 and 30A included therein are exemplarily described as aspects of the present disclosure, but the present disclosure is not limited thereto. The present disclosure may be implemented as a control method of performing the processing steps at components of the control devices 30 and 30A.

Moreover, the present disclosure may be implemented as a control program configured to cause a computer to execute the processing steps at components of the control devices 30 and 30A.

Furthermore, the present disclosure may be implemented as a storage medium (non-transitory computer-readable medium) in which the control program is stored. The control program may be stored and distributed in, for example, a removable media such as a compact disc (CD), a digital versatile disc (DVD), or a universal serial bus (USB) memory. Note that the control program may be uploaded onto a network through a non-illustrated network interface or the like included in the control devices 30 and 30A and may be downloaded from the network and stored in the storage 70 or the like.

The features and advantages of the embodiments should be clarified through the above detailed description. The claims include the features and advantages of embodiments as described above without departing from the spirit and scope thereof. Various modifications and changes of the present invention should be easily thought of by a person with ordinary skill in the art. Thus, the range of inventive embodiments is not intended to be limited to those described above but may include appropriate modifications and equivalents in a range disclosed in the above-described embodiments.

REFERENCE SIGNS LIST 1 power conversion system (PV-PCS, PCS)
1 DC voltage command value
1A power conversion system (ESS-PCS, PCS)
2 DC bus
2 DC voltage command value
3 AC circuit
4 solar panel (solar battery panel, PV panel)
4A energy storage system (ESS)
5 AC power grid (power grid, grid)
11 DC switch (DC breaker, DC switch)
12 DC capacitor (DC capacitor)
13 inverter (inverter circuit)
14 AC reactor (AC reactor)
15 AC capacitor (AC capacitor)
15a bifurcation point
16 AC switch (AC breaker, AC switch)

21 first current sensor
22 first voltage sensor
23 second current sensor
24 second voltage sensor
25 third current sensor
30, 30A control device
41 PLL controller
42 first converter
43 second converter
44 power controller
51 root mean square value calculator (RMS calculator)
52 modulation rate calculator
53 limiter adjuster
53a lower bound limiter set value acquirer
53b grid voltage root mean square value acquirer
53c rated value acquirer
53d divider
53e upper-lower bound limiter
53f multiplier
53g lower bound limiter operation value outputter
54 limiter
55 maximum power point tracking controller (MPPT controller)
56 first subtractor
57 DC voltage controller
61 first adder
62 third converter
63 second subtractor
64 current controller
65 pulse width modulation controller (PWM controller, inverter controller)
70 storage
82 modulation rate calculator
83 limiter adjuster
83a operation range lower bound voltage set value acquirer
83g operation range lower bound voltage operation value outputter
84 limiter
85 DC voltage operation range detector
86 operation controller
87 failure detector
90 processing circuit
91 processor
92 memory
93 hardware component
a straight line
a' dashed line
b thin straight line
b' thin dashed line
c thick dashed line
c' dashed line
$i^*_d$ d-axial current command value
$i^*_q$ q-axial current command value
$i^*_{AC}$ current command value
$i_{AC}$ inverter output current (current)
$i_{DC}$ DC current (current)
$i_{Grid}$ AC current (grid current, current)
P, $P_1$, $P_{1A}$, $P_{1B}$, $P_2$, $P_{2A}$, $P_{2B}$ power
$P_{mpp}$, $P_{mppA}$, $P_{mppB}$ optimum operation point
$P_{VA}$, $P_{VB}$ PV curve
t, $t_1$ to $t_{14}$ time point
$v'^*_{DC}$ DC voltage command value (first DC voltage command value)
$v^*_{DC}$ DC voltage command value (second DC voltage command value)
V voltage
$v_{DC}$ DC voltage (voltage)
$v_{Grid}$ grid voltage (voltage)
$v_L$ DC voltage command lower bound limiter
$v_{L1}$ lower bound limiter set value
$v_{L2}$ lower bound limiter operation value
$v_{L3}$ operation range lower bound voltage set value
$v_{L4}$ operation range lower bound voltage operation value
$v_{L4}$ operation range lower bound voltage
$V_{OCA}$, $V_{OCB}$ open voltage
$v_R$ rated value
$v_{RMS}$ grid voltage root mean square value
θ reference phase

The invention claimed is:

1. A control device in a photovoltaics power conversion system connected to a solar panel on a DC side, the control device comprising:
a modulation rate calculator configured to calculate a modulation rate based on a DC voltage on a DC side of the power conversion system and a grid voltage root mean square value on an AC side of the power conversion system;
a limiter adjuster configured to calculate a lower bound limiter operation value based on a predetermined lower bound limiter set value, the grid voltage root mean square value, and a predetermined rated value in accordance with the modulation rate calculated by the modulation rate calculator;
a limiter configured to update a DC voltage command lower bound limiter based on the lower bound limiter operation value calculated by the limiter adjuster;
a maximum power point tracking controller configured to calculate a first DC voltage command value by performing maximum power point tracking control based on DC power generated by the solar panel and determine a second DC voltage command value based on the calculated first DC voltage command value and the DC voltage command lower bound limiter set to the limiter; and
an inverter controller configured to control an inverter of the power conversion system based on the second DC voltage command value determined by the maximum power point tracking controller.

2. The control device according to claim 1, wherein when the lower bound limiter operation value is calculated by the limiter adjuster, the limiter updates the DC voltage command lower bound limiter based on the lower bound limiter operation value calculated by the limiter adjuster while being out of synchronization with the maximum power point tracking control by the maximum power point tracking controller.

3. The control device according to claim 1, wherein the limiter adjuster includes an upper-lower bound limiter configured to limit upper and lower bound values of the lower bound limiter operation value so that the lower bound limiter operation value does not become smaller than the predetermined lower bound limiter set value at least.

4. The control device according to claim 1, wherein the maximum power point tracking controller determines the value of the DC voltage command lower bound limiter to be the second DC voltage command value when the calculated first DC voltage command value is smaller than the value of the DC voltage command lower bound limiter set to the limiter, and the maximum power point tracking controller determines the first DC voltage command value to be the second DC voltage command value when the calculated first DC voltage command value is equal to or larger than the value of the DC voltage command lower bound limiter set to the limiter.

5. A photovoltaics power conversion system connected to a solar panel at which power generation is performed by sunlight, the photovoltaics power conversion system comprising:
    an inverter configured to convert DC power generated by the solar panel into AC power; and
    the control device according to claim 1.

6. A control device in an energy-storage-system power conversion system connected to an energy storage system on a DC side, the control device comprising:
    a modulation rate calculator configured to calculate a modulation rate based on a DC voltage on a DC side of the power conversion system and a grid voltage root mean square value on an AC side of the power conversion system;
    a limiter adjuster configured to calculate an operation range lower bound voltage operation value based on a predetermined operation range lower bound voltage set value, the grid voltage root mean square value, and a predetermined rated value in accordance with the modulation rate calculated by the modulation rate calculator;
    a limiter configured to update the operation range lower bound voltage based on the operation range lower bound voltage operation value calculated by the limiter adjuster;
    a DC voltage operation range detector configured to compare the DC voltage on the DC side of the power conversion system and the operation range lower bound voltage set to the limiter and determine whether the DC voltage is smaller than the operation range lower bound voltage; and
    an operation controller configured to stop an inverter of the power conversion system when it is determined by the DC voltage operation range detector that the DC voltage is smaller than the operation range lower bound voltage.

7. The control device according to claim 6, wherein when the operation range lower bound voltage operation value is calculated by the limiter adjuster, the limiter updates the operation range lower bound voltage based on the operation range lower bound voltage operation value calculated by the limiter adjuster while being out of synchronization with control by the DC voltage operation range detector.

8. The control device according to claim 6, wherein the limiter adjuster includes an upper-lower bound limiter configured to limit upper and lower bound values of the operation range lower bound voltage operation value so that the operation range lower bound voltage operation value does not become smaller than the predetermined operation range lower bound voltage set value at least.

9. An energy-storage-system power conversion system connected to an energy storage system capable of charging and discharging electric power, the energy-storage-system power conversion system comprising:
    an inverter configured to convert DC power supplied from the energy storage system into AC power; and
    the control device according to claim 6.

* * * * *